US009563616B2

(12) United States Patent
Howell et al.

(10) Patent No.: US 9,563,616 B2
(45) Date of Patent: *Feb. 7, 2017

(54) METHOD AND SYSTEM FOR GENERATING AND UTILIZING PERSISTENT ELECTRONIC TICK MARKS AND USE OF ELECTRONIC SUPPORT BINDERS

(71) Applicant: WORKIVA INC., Ames, IA (US)

(72) Inventors: Joseph Howell, Vancouver, WA (US); Scott Bacon, Thornton, CO (US); John Bonk, Louisville, CO (US); Brian Claridge, Centennial, CO (US); Alexander Iselin, Boulder, CO (US)

(73) Assignee: Workiva Inc., Ames, IA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/795,514

(22) Filed: Jul. 9, 2015

(65) Prior Publication Data

US 2015/0309978 A1 Oct. 29, 2015

Related U.S. Application Data

(63) Continuation-in-part of application No. 13/748,971, filed on Jan. 24, 2013, which is a continuation of application No. 12/614,217, filed on Nov. 6, 2009, now Pat. No. 8,375,291.

(60) Provisional application No. 61/112,402, filed on Nov. 7, 2008.

(51) Int. Cl.
*G06F 17/00* (2006.01)
*G06F 17/24* (2006.01)
*G06F 17/30* (2006.01)

(52) U.S. Cl.
CPC ....... *G06F 17/241* (2013.01); *G06F 17/30882* (2013.01)

(58) Field of Classification Search
CPC .................. G06F 17/241; G06F 17/30882
USPC ................. 715/200, 230–232, 233, 212–213
See application file for complete search history.

(56) References Cited

U.S. PATENT DOCUMENTS 5,253,362 A * 10/1993 Nolan .................. G06F 17/241
5,737,599 A * 4/1998 Rowe .................. G06F 17/211
6,047,259 A 4/2000 Campbell et al.
(Continued)

OTHER PUBLICATIONS

Rekimoto et al., Augment-able Reality, Situated Communication through Physical and Digital Spaces, IEEE 1998, pp. 1-8.*
(Continued)

*Primary Examiner* — Cong-Lac Huynh
(74) *Attorney, Agent, or Firm* — Drinker Biddle & Reath LLP

(57) ABSTRACT

An apparatus and computer-implemented method comprise providing an algorithm to a client device comprising a processor, a memory, and a user interface comprising a display and an input mechanism, displaying on the display a supported document comprising a supported data item data item, receiving an instruction for the supported data item to associate supporting document information to the supported data item, providing a data entry mechanism at which the supporting document information can be specified, receiving the supporting document information; and attaching the supporting document information in a persistent manner to the supporting data item.

24 Claims, 33 Drawing Sheets

(56) References Cited

U.S. PATENT DOCUMENTS

| | | | | |
|---|---|---|---|---|
| 6,665,798 B1* | 12/2003 | McNally | | G06F 21/629 |
| | | | | 713/150 |
| 6,859,909 B1* | 2/2005 | Lerner | | G06F 3/04883 |
| | | | | 345/440 |
| 6,948,154 B1 | 9/2005 | Rothermel et al. | | |
| 6,966,061 B1* | 11/2005 | Vance | | G06Q 10/00 |
| | | | | 705/7.24 |
| 7,100,110 B2 | 8/2006 | Shiraishi et al. | | |
| 7,284,191 B2* | 10/2007 | Grefenstette | | G06F 17/30867 |
| | | | | 707/E17.058 |
| 7,376,621 B1 | 5/2008 | Ling | | |
| 7,415,482 B2 | 8/2008 | Blake et al. | | |
| 7,415,667 B2 | 8/2008 | Rhodes | | |
| 7,644,375 B1 | 1/2010 | Anderson et al. | | |
| 7,769,646 B2 | 8/2010 | Wyle | | |
| 7,966,561 B1 | 6/2011 | Nguyen et al. | | |
| 8,032,837 B2 | 10/2011 | Bowman et al. | | |
| 8,086,758 B1 | 12/2011 | Allan et al. | | |
| 8,166,415 B2* | 4/2012 | Cisler | | G06F 9/4443 |
| | | | | 715/778 |
| 8,285,668 B2* | 10/2012 | Kaiser | | G06N 5/02 |
| | | | | 706/46 |
| 8,533,586 B1* | 9/2013 | Meyer | | G06F 17/241 |
| | | | | 715/230 |
| 8,739,025 B2 | 5/2014 | Haila et al. | | |
| 8,788,412 B1 | 7/2014 | Hamm | | |
| 8,813,178 B1 | 8/2014 | Khanna | | |
| 8,839,092 B2* | 9/2014 | Albornoz | | G06Q 10/10 |
| | | | | 715/221 |
| 9,372,859 B1* | 6/2016 | Maeng | | G06F 17/30011 |
| 2002/0082994 A1 | 6/2002 | Herziger | | |
| 2002/0141643 A1 | 10/2002 | Jaeger | | |
| 2002/0165875 A1* | 11/2002 | Verta | | G06F 19/327 |
| | | | | 715/213 |
| 2004/0024842 A1 | 2/2004 | Witt | | |
| 2004/0172594 A1* | 9/2004 | Jones | | G06F 17/2247 |
| | | | | 715/232 |
| 2004/0210822 A1* | 10/2004 | Kotler | | G06F 17/211 |
| | | | | 715/209 |
| 2004/0243552 A1* | 12/2004 | Titemore | | G06F 17/30696 |
| 2005/0114305 A1 | 5/2005 | Haynes et al. | | |
| 2006/0015811 A1* | 1/2006 | Tanaka | | G06F 17/241 |
| | | | | 715/230 |
| 2006/0053364 A1* | 3/2006 | Hollander | | G06F 17/30873 |
| | | | | 715/232 |
| 2006/0230056 A1 | 10/2006 | Aaltonen | | |
| 2007/0006301 A1 | 1/2007 | Nickell et al. | | |
| 2007/0099168 A1 | 5/2007 | Nielsen | | |
| 2007/0130502 A1* | 6/2007 | Tolgu | | G06Q 10/109 |
| | | | | 715/205 |
| 2007/0244775 A1* | 10/2007 | Linder | | G06Q 40/00 |
| | | | | 705/35 |
| 2008/0120505 A1 | 5/2008 | Mizuno | | |
| 2008/0133572 A1 | 6/2008 | Verhey-Henke et al. | | |
| 2008/0183664 A1 | 7/2008 | Cancel et al. | | |
| 2008/0189408 A1 | 8/2008 | Cancel et al. | | |
| 2008/0201315 A1 | 8/2008 | Lazier et al. | | |
| 2008/0209416 A1* | 8/2008 | De Souza | | G06Q 10/06 |
| | | | | 718/100 |
| 2009/0063567 A1 | 3/2009 | Matsunaga | | |
| 2009/0235253 A1* | 9/2009 | Hope | | G06Q 10/10 |
| | | | | 718/100 |
| 2010/0097072 A1 | 4/2010 | Lakshmanan et al. | | |
| 2010/0145742 A1 | 6/2010 | Carey et al. | | |
| 2010/0161460 A1* | 6/2010 | Vroom | | G06Q 40/123 |
| | | | | 705/31 |
| 2010/0211562 A1 | 8/2010 | Busch et al. | | |
| 2010/0235838 A1* | 9/2010 | Ibrahim | | G06Q 10/06 |
| | | | | 718/100 |
| 2010/0241950 A1 | 9/2010 | Meunier | | |
| 2010/0299176 A1* | 11/2010 | Mangipudi | | G06F 17/30554 |
| | | | | 705/7.26 |
| 2010/0318891 A1* | 12/2010 | Lo | | G06F 17/30554 |
| | | | | 715/214 |
| 2011/0047451 A1* | 2/2011 | Jardine-Skinner | | G06Q 10/06 |
| | | | | 715/234 |
| 2011/0154338 A1* | 6/2011 | Ramanathaiah | | G06Q 10/107 |
| | | | | 718/100 |
| 2011/0239102 A1 | 9/2011 | Tanaka et al. | | |
| 2011/0293135 A1* | 12/2011 | Irons | | H04N 1/2166 |
| | | | | 382/101 |
| 2012/0011118 A1 | 1/2012 | Gleicher et al. | | |
| 2013/0325769 A1* | 12/2013 | Downs | | G06F 17/2745 |
| | | | | 706/18 |
| 2014/0006921 A1* | 1/2014 | Gopinath | | G06F 17/241 |
| | | | | 715/230 |
| 2014/0013204 A1* | 1/2014 | Theis | | G06F 17/24 |
| | | | | 715/234 |
| 2014/0019187 A1* | 1/2014 | Olsen | | G06Q 10/06313 |
| | | | | 705/7.23 |
| 2014/0033012 A1* | 1/2014 | Dhillon | | G06F 17/2288 |
| | | | | 715/229 |
| 2014/0047308 A1* | 2/2014 | Chub | | G06F 17/24 |
| | | | | 715/201 |
| 2014/0095987 A1* | 4/2014 | Rodgers | | G06F 17/30011 |
| | | | | 715/243 |
| 2014/0164267 A1 | 6/2014 | Bianchini | | |
| 2014/0337318 A1* | 11/2014 | Zhang | | G06F 17/30719 |
| | | | | 707/722 |
| 2014/0359411 A1* | 12/2014 | Botta | | G06F 17/2288 |
| | | | | 715/205 |
| 2015/0100872 A1* | 4/2015 | Beezer | | G06F 17/241 |
| | | | | 715/230 |
| 2015/0199405 A1* | 7/2015 | Redlich | | G06Q 10/10 |
| | | | | 707/770 |
| 2015/0212996 A1* | 7/2015 | Plante | | G06F 17/241 |
| | | | | 715/230 |
| 2015/0220638 A1* | 8/2015 | Motoyama | | G06F 17/30864 |
| | | | | 707/722 |
| 2015/0271128 A1* | 9/2015 | Mantey | | G06F 3/0482 |
| | | | | 715/752 |
| 2016/0054898 A1* | 2/2016 | Kotler | | G06F 17/21 |
| | | | | 715/209 |

OTHER PUBLICATIONS

Bellotti et al., Taking Email to Task: The Design and Evaluation of a Task Management Centered Email Tool, ACM 2003, pp. 345-352.*

Geyer et al., Chat Spaces, ACM 2004, pp. 333-336.*

Anonymous, "100% of companies using CLARITY FSR(TM) for their SEC XBRL submission successfully file without any EDGAR XBRL validation errors," Canada NewsWire, Ottawa, Aug. 17, 2010, 2 pages.

Brands, "XBRL tools can help," Strategic Finance, 94(5), Nov. 2012, 3 pages.

Business Wire, "Ez-XBRL Solutions Releases Enhanced XBRL Validator," Business Wire, May 17, 2011, 2 pages.

Chao et al., "PDF Document Layout Study with Page Elements and Bounding Boxes," Google, 2000, 3 pages.

Cho et al., "Building Project Scope Definition Using Project Definition Rating Index," Journal of Architectural Engineering, Dec. 2001, pp. 115-125.

Copanion, "Creating Tick Marks with Adobe Acrobat on Scanned Tax Document PDF Files," Google, 2007, pp. 1-6.

Corefiling, "Magnify Edgar Filings with Confidence," CoreFiling Precision Reporting, 2013, 3 pages.

Mahoney et al., "Creating XBRL Instance Documents in Excel," The CPA Journal Online, <http://www.nysscpa.org/cpajournal/2007/707/essentials/p66.htm>, Jul. 2007, 6 pages.

Marshall, "The Haunting Questions of Intelligibility," Google.com Search Engine, 2001, 8 pages.

Pendergast, "Three Short Cases for use in Online Introduction to Computer Information Systems Courses," SIGITE Newsletter 5(10), Jan. 2008, 10 pages.

(56) References Cited

OTHER PUBLICATIONS

Slater, "The TickIT Certification Scheme," IEEE, 1991, 13 pages.

* cited by examiner

| New | Duplicate | Export PDF | Add | View | Permissions | Notify | Actions | Delete |

2013 ABC Q2 Demo 10Q WF – Support Binder ~ 302

| TAB [+] 305 | DOCUMENT [+] 310 | STATUS [O] |
|---|---|---|
| 2013 ABC Q2 Demo 10Q WF | ☐ 2013 ABC Q2 Demo 10Q WF Version 1 | |
| Cover Page | ☐ 2013 ABC Q2 Demo 10Q WF – Cover Page | |
| PART I – FINANCIAL INFORMATION | ☐ ABC CCSI WP1 | |
| | ☐ ABC Company SI WPv1 | |
| | ☐ ABC Statement of Income Workpaper | |
| | ☐ Goodwill – Purchased WP | |
| | ☐ Accounting Policies Workpaper | |
| Notes – Net Income Per Share | ☐ ABC_2014_SupportDoc | |
| | ☐ ABC_2013_SupportDoc | |
| | ☐ StockOptions_MarketValue_2014 | |
| | ☐ StockOptions_MarketValue_2013 | |
| PART II – OTHER INFORMATION | ☐ Exhibit WP | |
| | ☐ Exhibit WP2 | |
| | ☐ Unregistered Sales Workpaper | |

| Name | Created By | Last Modified |
|---|---|---|
| Document | S. Jones | 6/10/14 |
| Workbook | S. Jones | 6/10/14 |
| Presentation | S. Jones | 6/10/14 |
| Book/Binder | S. Jones | 6/10/14 |
| Data Collection | S. Jones | 6/10/14 |

Figure 18:
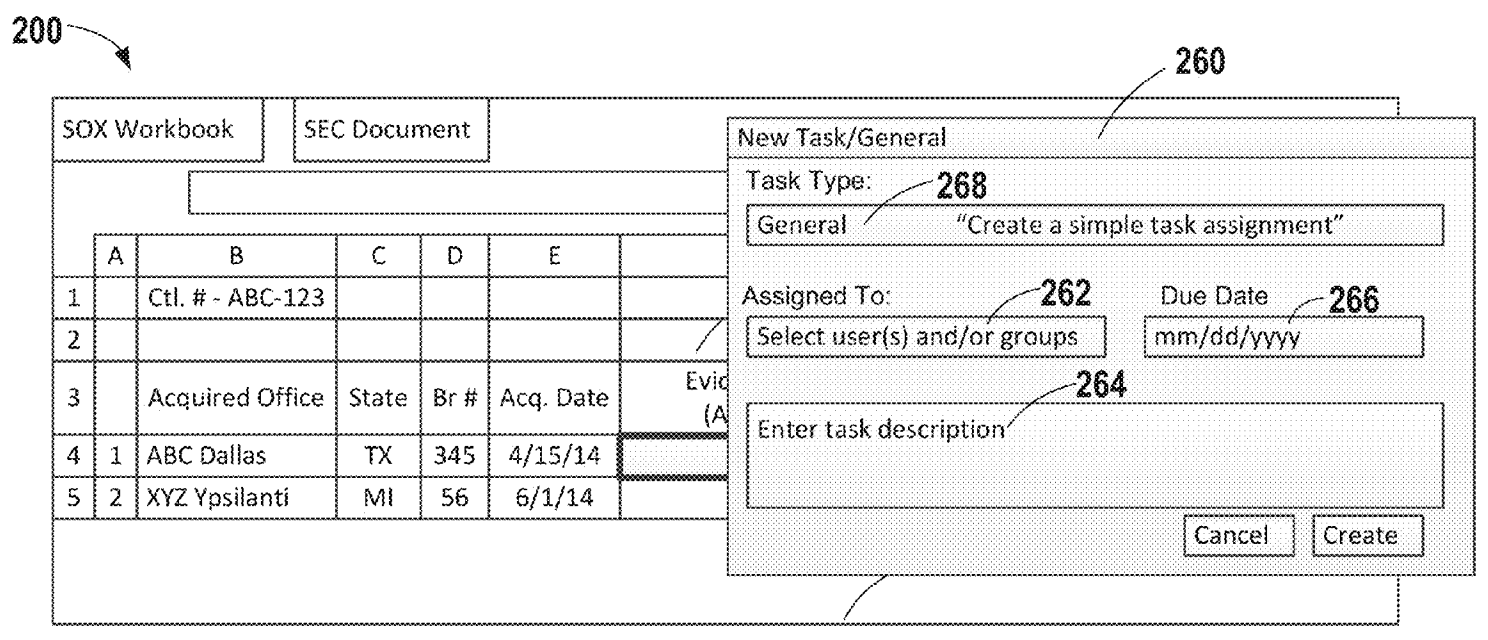

| | A | B | C | D | E | |
|---|---|---|---|---|---|---|
| | | | | | | Evid<br>(A |
| 1 | | Ctl. # - ABC-123 | | | | |
| 2 | | | | | | |
| 3 | | Acquired Office | State | Br # | Acq. Date | |
| 4 | 1 | ABC Dallas | TX | 345 | 4/15/14 | |
| 5 | 2 | XYZ Ypsilanti | MI | 56 | 6/1/14 | |

SOX Workbook | SEC Document

200

New Task/General — 260

Task Type: — 268
General    "Create a simple task assignment"    Due Date — 266
                                                 mm/dd/yyyy Assigned To: — 262
Select user(s) and/or groups 264
Enter task description Cancel    Create

(Figure shows a SOX Workbook spreadsheet with a "New Task/General" dialog overlay containing Task Type options: General, Attachment Request, Approval; fields for selecting users/groups, date (mm/dd/yyyy), task description, and Cancel/Create buttons. Callouts: 200, 260, 268.)

FIG. 20

| SOX Workbook | SEC Document | | | | | | Attachments |
|---|---|---|---|---|---|---|---|
| | | | | | | | List View |
| | A | B | C | D | E | F | G | (F4) Attach. Req. |
| 1 | | Ctl. # - ABC-123 | | | | | | + Select file(s) to attach |
| 2 | | | | | | | | Task: S. Jones |
| 3 | | Acquired Office | State | Br # | Acq. Date | Evidence Link (All Docu.) | Preparer | Due: 8/1/14 |
| 4 | 1 | ABC Dallas | TX | 345 | 4/15/14 | | S. Jones | Text description describing task. |
| 5 | 2 | XYZ Ypsilanti | MI | 56 | 6/1/14 | | S. Jones | |

430 — Attachments panel
437 — (F4) Attach. Req.
434 — Task: S. Jones
436 — Due: 8/1/14
438 — Text description describing task.
210 — Evidence Link cell
200 — SOX Workbook
400 — Window

FIG. 21

Andy Smith requests attachment(s) for "SOX Controls 2014"

From: Wdesk Notifications <notifications@workiva.com>
Date: Wed, Sept 12, 2014 at 10:52 AM
To: janet.jetson@goliath.com Andy Smith (andrew.smith@goliath.com) requests you provide supporting attachment(s) for "SOX Controls 2014" by Thursday, August 21.

Description:
Evidence for R01 C13 from March 2014 to Aug 2014.

[Attach Requested Files]

FIG. 23

| | A | B | C | D | E | F | G |
|---|---|---|---|---|---|---|---|
| 1 | | Ctl. # - ABC-123 | | | | | |
| 2 | | | | | | | |
| 3 | | Acquired Office | State | Br # | Acq. Date | Evidence Link (All Docu.) | Preparer |
| 4 | 1 | ABC Dallas | TX | 345 | 4/15/14 | | S. Jones |
| 5 | 2 | XYZ Ypsilanti | MI | 56 | 6/1/14 | | S. Jones |

Attachments

List View (F4) Attachment 1

ABC_Amer_Acct
S. Jones    8/1/14

✓ Approval Requested!

FIG. 28

METHOD AND SYSTEM FOR GENERATING AND UTILIZING PERSISTENT ELECTRONIC TICK MARKS AND USE OF ELECTRONIC SUPPORT BINDERS

CROSS REFERENCE TO RELATED APPLICATIONS

This patent application is a continuation-in-part of application Ser. No. 13/748,971, filed Jan. 24, 2013, which is currently pending, which is a continuation of application Ser. No. 12/614,217, filed Nov. 6, 2009, now issued as U.S. Pat. No. 8,375,291, which claims the benefit of the filing date of the provisional patent application with Application Ser. No. 61/112,402, filed on Nov. 7, 2008, entitled, "Method and System for Generating and Utilizing Persistent Electronic Tick Marks", all of which are incorporated herein by reference.

BACKGROUND

The present disclosure relates generally to tools and techniques for data management, and more specifically, to systems and methods for annotating electronically-stored data with user-viewable, machine-readable, persistent, electronic tick marks.

When performing an audit, it has long been conventional for auditors to prepare schedules, analyses, transcriptions, memos, and confirmation results to be included in one or more documents generally referred to as work papers. These work papers serve as the basis for documenting the work performed by the auditor during the auditor's examination and evaluation of an entity's accounting and/or financial records—in the case of a financial audit—or, policies and operations—in the case of an internal or compliance audit. The work papers may ultimately be relied upon to support an auditor's opinion regarding the financial "fairness" of the financial statements, or an opinion expressing the extent to which an entity is in compliance with a certain set of internal or external policies and regulations.

During the audit process, it is customary for auditors to manually (e.g., by hand) annotate the work papers with various symbols, commonly referred to as tick marks, to convey certain information about the audit process. For example, as illustrated in FIG. 1, an auditor may place a checkmark symbol 10 next to a particular item in the work papers 12 to indicate that the auditor examined corresponding source documents 14 related to the particular item. If, for example, the item in the work papers is a brief statement regarding the value of a particular financial asset, a checkmark symbol 10 placed next to the brief statement may be used to indicate that the auditor has verified the accuracy of the brief statement by examining one or more supporting financial documents 14 associated with the corresponding financial asset. Different tick mark symbols may be used to convey different information about the audit process. The meaning of each type of tick mark can typically be found in a tick mark legend 16, which is often included with or attached to the work papers 12.

Although tick marks have long been associated with the audit process, tick marks are also frequently used by internal accounting personnel when preparing documents, such as regulatory filings. Despite the increased reliance on modern computer and software systems for preparing documents and performing audit-related tasks, the practice of using tick marks has changed very little. For instance, when using conventional database, document processing and spreadsheet applications to prepare documents and/or perform audit-related tasks, accounting personnel and auditors will frequently utilize one or more numbers, letters or symbols, such as an asterisk ("*"), as electronic versions of tick mark symbols. In some cases, the Microsoft Wingdings® font, which renders characters as a variety of symbols, is used to represent various tick mark symbols. In any case, the characters representing the tick mark symbols are typically generated within the framework of whatever conventional document processing or spreadsheet application is being used. For example, using a spreadsheet application, an auditor may place an asterisk ("*") in a cell of a worksheet to convey some information about a value in a neighboring cell of the worksheet.

Utilizing electronic tick mark symbols with conventional database, document processing and spreadsheet applications poses a variety of problems. First, with conventional database, document processing and spreadsheet applications, it is extremely easy to modify data and/or create a new copy or version of a document or file. Consequently, a tick mark symbol present in one version of a document or file may become lost or corrupt on subsequent versions of the document or file. Furthermore, an item or value presented in one document may be dependent (e.g., by means of a reference, formula, or link) upon an item or value in one or more other documents.

Consequently, an item or value associated with a particular tick mark may change, thereby causing the tick mark and its corresponding legend to become irrelevant or invalid. In addition, the tick mark legend that explains the meaning of each tick mark symbol may become lost, disassociated or stale, thereby rendering tick marks included in a particular document or file irrelevant or invalid.

Finally, even when a tick mark in a document or file is valid, the tick mark and its associated entry in the tick mark legend may not provide sufficient and relevant information regarding the validation and verification process, or the supporting documents, files and database items that have been referenced by an auditor. These shortcomings frequently cause unwanted errors, wasted efforts and higher costs associated with manually reviewing and re-reviewing successive versions of documents to ensure that they are correct.

The traditional accounting practices have made heavy use of the concept of support binders and their relationship to forms, reports, and documents that are presented, filed, or otherwise produced. Historically, evidence supporting a report, filing, or other summary of data, particularly with regard to financial records, has been kept in numerous physical binders that are located in shelves or stored in boxes. These physical binders contain paper that serves as the definition for forms, letters, spreadsheets, data aggregations, and reports. For many reasons, utilizing such physical binders is less than ideal, including difficulty in accessing data, moving information around, updating, vulnerability to damage and loss, etc.

In short, the support binders contain information that is not presented, filed or produced, but serve to contain supporting evidence for the information that is-such documents can be referred to as "supporting documentation" or "work papers". By way of example, a person may file a 1040 form containing their income tax statement which contains a Schedule A form identifying various deductions the filer is permitted to claim. Although both the 1040 and the Schedule A form are filed with the IRS, supporting documentation, such as receipts for charitable donations are not. Nonetheless, this supporting documentation must be kept on-hand in case the person's taxes are audited, since it serves as the basis for information on the forms that are filed.

Businesses do the same thing when they filing their 10-Q or 10-K forms with the Securities and Exchange Commission (SEC). The form may be over one hundred pages and is full of numbers—each of which are supported by a supporting document. All of these supporting documents are grouped together and kept in a "support binder", which is traditionally a plurality of three-ring binders that are co-located on a shelf, in a drawer or cabinet, etc.

These source supporting documents can be a wider variety of document types and may originate from many different areas of the business. For example, they may come out of the business' main centralized financial system or they might come from different departments. They might be internal financial reports and might contain justification of numbers. Supporting documents can be as unstructured as an email from the CFO providing particular wording for a particular group of numbers. Thus, supporting documents can not only support numbers, but they can also support text or wording in the final document. The entire collection of supporting documents bundled together forms the support binder.

Historically, a support binder has been largely a physical paper-based system comprising many three-ring binders, even when other aspects of the reporting are electronic. In this context, the process of "ticking and tying" has been a very manually intensive process. An accountant will sit down at their desk with a one hundred and twenty page filing document, and have all of the supporting documents in a pile on their desk. The accountant then goes through with a pen and "ticks" each relevant value, text field, etc. requiring support in the filing document once it is located in the supporting document.

An annotation is made in the supporting document regarding its use in the filing document, which constitutes the "tie". The tick and tie are each created with some form of annotation such as a bracket, arrow, circle, etc., and are usually initialed and dated by the accountant or person doing the review. Often another individual, such as an approver, will go through the same procedure to check the original reviewer's work, and they will also initial and date the documents, indicating that they verified the ticks and ties created by the original reviewer. Since each page of the one hundred and twenty page form will likely have multiple ticks and ties, such a process is very labor intensive and can take two to upwards of five days to work through such a form and properly tick and tie it.

Furthermore, reviewers of manual documents cannot fully appreciate the relationships between values just by looking at a printed copy, i.e., know which other values will or will not change, based on the changing of a first value.

It has long been desirable to keep both the filing documents and related supporting documents in electronic form in order to offset the difficulties noted above with respect to paper filings. However, encompassing all of the functionality of traditional binders has proven difficult to fully implement electronically.

BRIEF DESCRIPTION OF THE DRAWINGS

Some embodiments are illustrated by way of example and not limitation in the figures of the accompanying drawings in which:

FIG. 11 is a screen shot of a support binder, according to an embodiment of the invention;

FIG. 14 is a screen shot illustrating the selection of a new attachment;

FIG. 18 is a screen shot illustrating an embodiment for associating a task with a supported document field;

FIG. 19 is a screen shot illustrating a selection of a task type;

FIG. 20 is a screen shot illustrating entry of data for an attachment request;

FIG. 21 is a screen shot illustrating a supported document field with an attachment request associated with it;

FIG. 23 is an example email related to an attachment request;

FIG. 28 is a screen shot illustrating the supported document field with an approval request associated with it;

DETAILED DESCRIPTION

Figure 1:
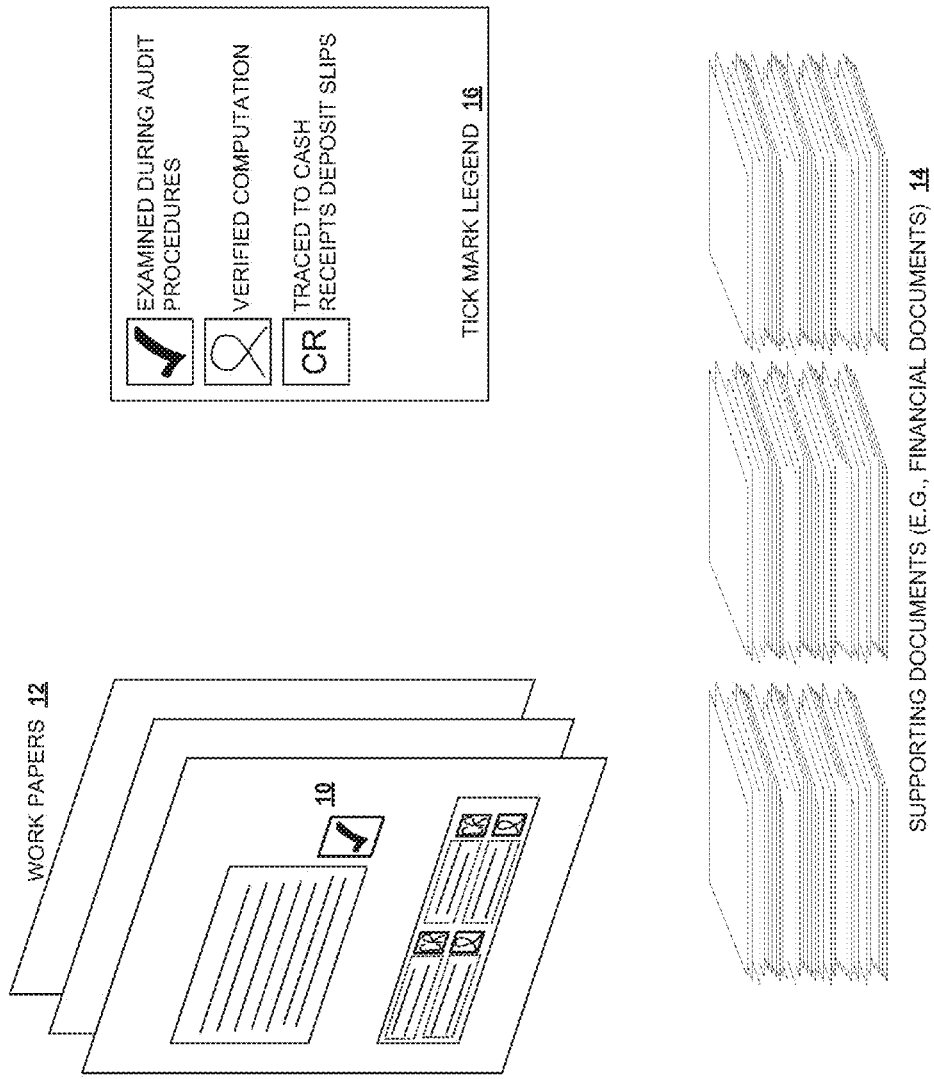
FIG. 1 is a pictorial diagram that illustrates an example of a tick mark legend and conventional audit-related work papers that have been annotated manually (e.g., by hand) with tick mark symbols.

Methods and systems for annotating electronically-stored data with user-viewable, machine-readable, persistent, electronic tick marks are disclosed. In the following description, for purposes of explanation, numerous specific details are set forth in order to provide a thorough understanding of the various attributes in example embodiments. It will be evident, however, to one skilled in the art that the present invention may be practiced without these specific details, or, with various combinations of the attributes described.

In one aspect, a computer-based data annotation tool for use with a document preparation application is provided. The data annotation tool enables a user of the document preparation application to annotate various document elements or items of data ("data items" or "data elements") within a document by generating and positioning persistent (e.g., sticky) tick marks within the document. As defined herein, a document ("document") may be, but is not limited to, a human-readable presentation of data items whose inclusion, exclusion, rendering, and value within the document are maintained by a manual process administered by the user, an automated or computer-assisted process that generates some or all attributes of the data items, or a combination of manual and automated processes. In one sense, a document may be viewed as a portal, carrier, container, or even shell for one or more data items. A tick mark is persistent in the sense that the tick mark is associated with and attaches to a particular value of a data item displayed within the document. As such, whenever the data item is retrieved from a database and presented via the document preparation application, the tick mark will be displayed with the data item. In the context of the present disclosure, a data item with which a tick mark may be associated includes, but is not limited to: a word, sentence, paragraph, number, chart, graph or figure. Note that as the underlying value changes, the tick mark expires, making the persistence related to a current- or prior-value state (although the presence of an obsolete tick mark can serve as an alert flag, even if it does not verify the integrity of the data value).

A persistent tick mark may be displayed with a data item across numerous user sessions, within multiple sections of a document, or in any number of documents. Take for instance an example where a team of accountants are preparing multiple sections of a financial document to be filed with a government regulatory agency, such as the Securities and Exchange Commission (SEC). Utilizing a data annotation tool consistent with an embodiment of the invention, a first accountant, while preparing the enterprise's balance sheet, may place a tick mark next to a dollar amount representing the value of the enterprise's accounts receivable and possibly a particular version or time or timestamp of the value. In this example, the tick mark may convey information indicating that the first accountant has verified that the dollar amount for the accounts receivable is accurate. If, during a subsequent user session, a second accountant is preparing a different section of the document that also references the enterprise's accounts receivable, the tick mark placed by the first accountant will be displayed along with the dollar amount representing the value of the accounts receivable, even though the tick mark was originally added in a different section of the document (e.g., the balance sheet) during a previous user session.

In contrast to any number of conventional document annotation tools and techniques, a tick mark consistent with an embodiment of the invention is generated and stored in such a way that the tick mark is directly associated with its time of creation and attached to a value of a particular item of data with which it is presented or displayed. For instance, in one embodiment of the invention, the tick mark and the item of data with which it is associated are stored in a common data structure. For example, the tick mark and associated data item may be two different components of a common XML (Extensible Markup Language) tag. Additionally, in one embodiment, the tick mark and its associated data item may be bound by a rule, referred to herein as a tick mark rule. A tick mark rule, for example, may indicate that a particular tick mark should be modified in some way when presented in a document, if the data item with which the tick mark is associated is ever modified. A tick mark rule may, for example, indicate that the graphical depiction (e.g., the actual symbol) of the tick mark is to change when the underlying value of the corresponding item of data changes. For instance, the color of a tick mark may change from green to red to indicate that the value to which the tick mark is attached has changed. Alternatively, the graphic symbol itself may change to indicate that the underlying value has changed. Accordingly, a user who is viewing a document subsequent to the initial placement of the original tick mark will immediately recognize a modified tick mark, and will therefore appreciate that the data item with which the now modified tick mark is associated has itself been modified subsequent to the placement of the original tick mark.

A tick mark consistent with an embodiment of the invention is associated with a data item, and attaches to the data item and a particular value state (i.e., the value at a particular time). For example, a tick mark may be associated with a number representing the value of a particular asset. If, at the time the tick mark is generated and placed, the value of the asset is one-hundred twenty-five dollars ($125), then the tick mark attaches to the value of the item, that is, one-hundred twenty-five dollars ($125). This is in contrast to various conventional software applications which allow, for example, the placement of a graphical icon or other graphical element next to a data item, with no association or linkage to the data item or metadata associated with the data item. For example, in various conventional spreadsheet applications a comment may be inserted into or associated with a cell to convey some information about the data in the cell, or in a neighboring cell. However, in such a case, the comment can only be said to be associated with the cell, or the neighboring cell. If, for example, the value within the cell changes, the comment will still be displayed. Similarly, if the data item within the cell is moved to another cell, the comment is not automatically moved as well.

Referring again to the example where a team of accountants are preparing financial documents to be filed with the SEC, a first accountant may place a tick mark symbol next to a dollar amount in the balance sheet representing the value of the enterprise's accounts receivable. If the value of the accounts receivable is derived using a formula, and the value of the accounts receivable is therefore dependent upon some other underlying values, a change to one of the underlying values may result in a change to the dollar amount representing the value of the accounts receivable. Accordingly, if such a change occurs and results in a change to the value of the accounts receivable, the tick mark symbol displayed along with the value of the accounts receivable will also change to indicate that the value of the accounts receivable has changed. Of course, if a value to which a tick mark has been attached is not dependent upon any underlying data, any direct change made to the value will also result in a change to the corresponding tick mark. For example, if a user simply edits the text representing the value, the resulting change to the value will trigger a modification to the tick mark symbol that is displayed along with the value. Accordingly, there are a number of reasons that a document element or item of data might change, thereby resulting in a corresponding change to an associated tick mark symbol.

Consistent with an embodiment of the invention, a tick mark is depicted as a graphical symbol and is presented, next to, on, or near the value of the data item with which it is associated and attached. In one embodiment, a computer-based data annotation tool may include a library of tick marks, where each tick mark in the library is a different graphical symbol and conveys different information. For example, one tick mark symbol may be used to convey that the user who placed the tick mark symbol has analyzed one or more external supporting documents or data sources to verify the accuracy of the value of the data item to which the tick mark symbol is associated and attached. Another tick mark symbol may indicate that the corresponding value of the data item is derived by a formula, and the presence of the tick mark indicates that a user has analyzed the accuracy of the formula, and/or the data on which the formula depends. Another tick mark symbol may indicate that an item of data has yet to be analyzed for accuracy. Another tick mark symbol may indicate that an item of data is being used within a document in the proper context. In yet another example, a tick mark symbol may be customized in some way to convey information indicating the source of the tick mark—for example, the user who placed the tick mark symbol. Each tick mark symbol in the library may be associated with a definition, which may be viewable by means of a tick mark legend. It will be readily apparent to those skilled in the art that any number of tick mark symbols may be used and defined via the tick mark legend.

In some embodiments, a tick mark symbol may be used to convey that a particular item of data is being used in the proper context. A tick mark symbol used in such a manner may be referred to as a contextual tick mark. For example, a contextual tick mark may be a symbol that, when positioned next to or near an item of data, indicates that the item of data is being used correctly within the document, in view of the overall context of the document and/or the particular portion of the document containing the item of data. In some instances, one or more rules or regulations may dictate that a document includes certain content, and/or that a document be formatted in a particular manner Consistent with some embodiments of the invention, a contextual tick mark may be positioned next to an item of data to indicate that someone has confirmed that the item of data is being used properly in view of such a rule or regulation. In an additional embodiment, the tick mark can represent that evidence in support of a conclusion has been attached to the data item. Similarly, in some instances, it may not be readily apparent that a particular item of data is the correct item of data for use in a particular context. For instance, if a rule or regulation is requesting a particular financial data item, it may be confusing to the person preparing the document as to whether the correct item of data has been selected for display in a particular portion of the document. Accordingly, the person preparing the document may add a contextual tick mark next to a particular item of data, with a view to having an auditor or reviewer, verify that the item of data is in fact the proper item of data in the particular context of the document. During the review of the prepared document, the contextual tick mark previously positioned next to a data item can be manipulated, for example, by changing the color of the actual symbol or by adding a textual note or description, to indicate that the auditor or reviewer has confirmed the proper contextual use of the item of data.

In some embodiments, a particular type of contextual tick mark symbol may be used to indicate that certain metadata associated with an item of data displayed in a document is the correct metadata. For example, in some embodiments, human readable data elements displayed in a document may have computer-readable counterparts, for example, expressed in an XML-based language (i.e., eXtensible Markup Language). One particular language that may be used is referred to as the eXtensible Business Reporting Language, or XBRL. XBRL is an open data standard for financial reporting that allows information modeling and the expression of semantic meaning commonly required in business reporting. XBRL can be used to define and exchange financial information, such as might be included in a financial statement. Accordingly, consistent with embodiments of the invention, a tick mark symbol may be used to indicate that an auditor or document reviewer has reviewed an XBRL expression (e.g., XML element, tag, or attribute) that is associated with a particular data item displayed in a document, to ensure that the proper XBRL expression has been selected by the person preparing the document. Because XBRL expressions are generally computer-readable and therefore only processed by computers, passive users of XBRL data will generally not visually recognize errors. Consequently, verifying that a data item has been associated with a correct XBRL expression that is being used in the proper context of the document, and memorializing the verification with a tick mark symbol, has the effect of significantly reducing the potential of introducing errors in computer-processed documents. In various alternative embodiments, XML-based languages other than XBRL may be used. As such, tick mark symbols may be used to indicate the proper selection of XML expressions (e.g., tags or elements) for languages and schemas other than those associated with XBRL.

In some embodiments, a tick mark symbol displayed by the document preparation application may exhibit interactive characteristics. For example, when a user manipulates a pointing device or cursor control device (e.g., a mouse) to position a cursor over a tick mark symbol displayed in a document, a pop-up or fly-out window or text box, or some other graphical user interface element may be displayed. The graphical user interface element (e.g., pop-up or fly-out window) may display a variety of information (e.g., metadata) related to the tick mark symbol and its corresponding item of data. For instance, a pop-up or fly-out window may include information such as: a name, username or some other identifier of the person who originally placed the tick mark, a textual comment or note provided by the person who originally placed the tick mark, a time stamp indicating the day and time when the tick mark was originally placed, or a link (e.g., hyperlink) to a supporting document or related item of data in a database. Naturally, other information may also be displayed in a pop-up or fly-out window. Some of the information shown in a pop-up or fly-out window may be automatically added by the data annotation tool when the tick mark symbol is originally placed. For instance, information indicating who placed the tick mark, and when, may be automatically added by the data annotation tool. Other information, such as user notes and links to supporting documents and data, may be added by the user.

As described in greater detail below, in one embodiment, a separate graphical user interface element may be used to display information associated with tick mark symbols. For example, a separate tool bar, window, information box or frame may display information associated with those tick mark symbols that are being displayed by the document preparation application. Accordingly, as a user scrolls through a document, the information displayed in the separate graphical user interface element (e.g., window or information box) may change as the number and type of tick mark symbols that are displayed changes.

In one embodiment of the invention, the document preparation application may include a display mode toggle mechanism to place the document preparation application in one of several display modes. For instance, in a first display mode, the document preparation application may display all information associated with tick mark symbols embedded or positioned within the document. Accordingly, when an item of data has a corresponding tick mark symbol attached to it, the tick mark symbol will be displayed with the item of data in the document. In a second display mode, the document preparation application may "hide" all tick mark symbols. This may be useful, for example, when a user wants to view the document without the distraction of the tick mark symbols, or when a user wants to print a document without printing the tick mark symbols. Similarly, when a document has been finally approved and is ready to file with a regulatory agency, it is necessary to enable the document preparation application to generate a version of the document suitable for filing, for example, without tick mark symbols. In yet another display mode, a user may select to have the document preparation application display only the tick marks that were generated and placed by a certain user or users, or within a certain period of time, or certain types of tick marks.

Although various aspects of the invention will find practical application in a wide variety of contexts, embodiments of the invention described herein are presented in the context of a multi-user, computer-based, document annotation system, which may be used, for example, in viewing and/or preparing one or more documents to be filed with a government regulatory entity such as the United States Securities and Exchange Commission (SEC), the Environmental Protection Agency (EPA), the Food and Drug Administration (FDA), or the Department of Energy (DOE), among others. Accordingly, the various persistent tick marks generated by the document annotation tool described herein may be used to convey the same type of information as is meant to be conveyed by the manual tick marks used by an auditor. Because each tick mark is generated and stored in such a way that the tick mark is directly associated with or linked to a particular data item or document element with which it is presented, those skilled in the art will recognize that various embodiments of the invention may prove beneficial in any number of multi-user application environments for which tight control over the modification of user-generated content is desirable. Various embodiments of the invention may be implemented for use with other types of data and/or document systems for tasks including, but not limited to: managing, editing, viewing, commenting, or distributing data and/or documents.

Figure 2:
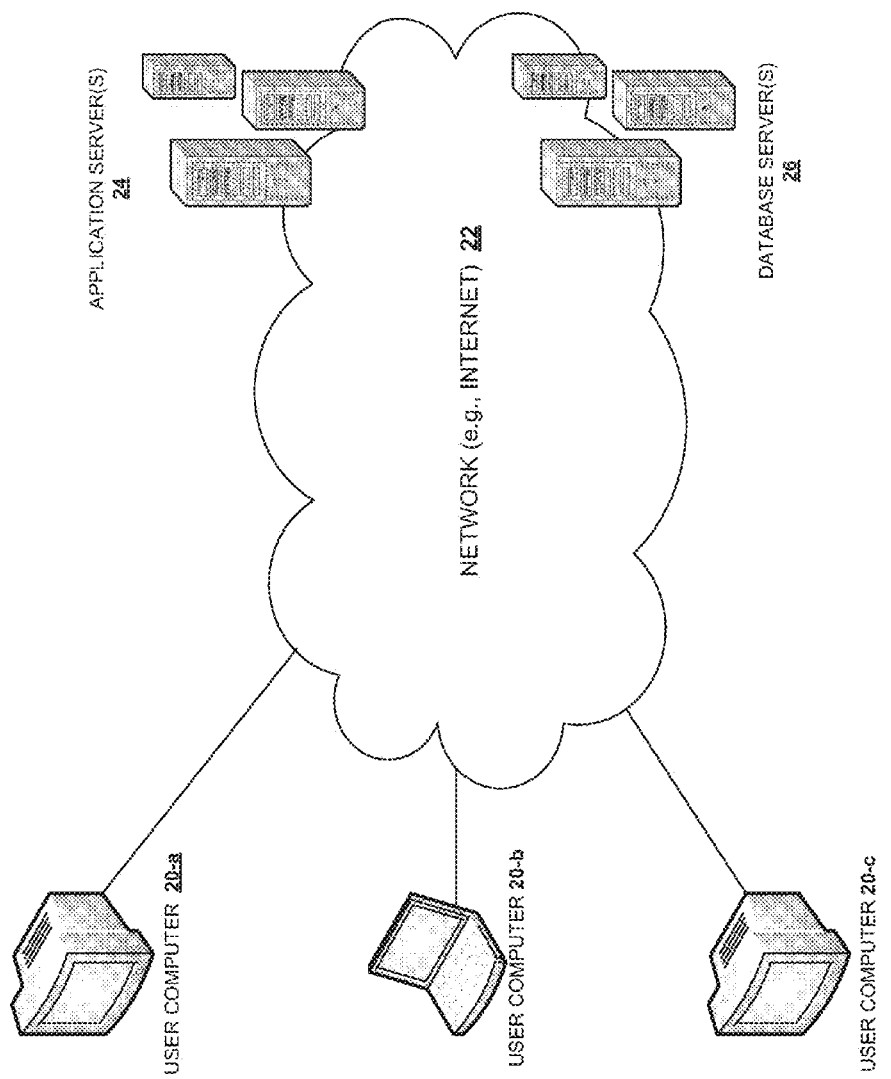
FIG. 2 is a block diagram illustrating at a system level the various computing devices with which a document annotation application may be implemented, according to an embodiment of the invention.

FIG. 2 is a block diagram illustrating at a system level the various computing devices with which a data annotation tool may be implemented, according to an embodiment of the invention. As illustrated in FIG. 2, an example data annotation tool may be implemented in a client-server framework and include one or more user computers (e.g., 20-a, 20-b, and 20-c) coupled to a network 22 that includes application servers 24 and database servers 26. In one embodiment of the invention, each user computer 22 executes a conventional web browser application which receives, renders and displays internet documents received from the application server(s) 24. The application servers 24 retrieve data from the database servers 26 and other content sources, and communicate internet documents to the web browser applications executing on the user computers 20. Accordingly, in one embodiment, one or more application servers 24 may be, or include, a web server or content server for serving content to the web browser applications executing on the user computers 20. In addition, application logic in the form of executable or interpretable instructions may be communicated from the application servers 24 to the user computers where the application logic is executed or interpreted by a client-side application, such as a conventional web browser application, or browser plug-in. In this way, documents displayed in a conventional web browser window may be edited and tick mark symbols can be embedded within the documents, while storing any user edits and tick marks at a server or database on the network. In an alternative embodiment, instead of a conventional web browser application, a proprietary client application may be used on the user computers to receive, render and edit documents.

In one embodiment of the invention, the data annotation tool may be provided as an integrated software component or service that is part of a document preparation application. Alternatively, the data annotation tool may be a standalone application that operates in conjunction with any of a variety of conventional document preparation or processing applications. When implemented as an integrated solution, the document preparation application and data annotation tool may be made available to consumers under a conventional software license, or as a subscription-based service. Accordingly, the document preparation application and data annotation tool may execute on and utilize application servers and database servers that are owned and maintained by the enterprise providing the data annotation tool, or alternatively, by a third party who provides utility computing resources. Furthermore, although FIG. 2 depicts a client-server framework, an embodiment of the invention may be implemented as a standalone application, for example, residing and executing on a single user computer.

Figure 3:
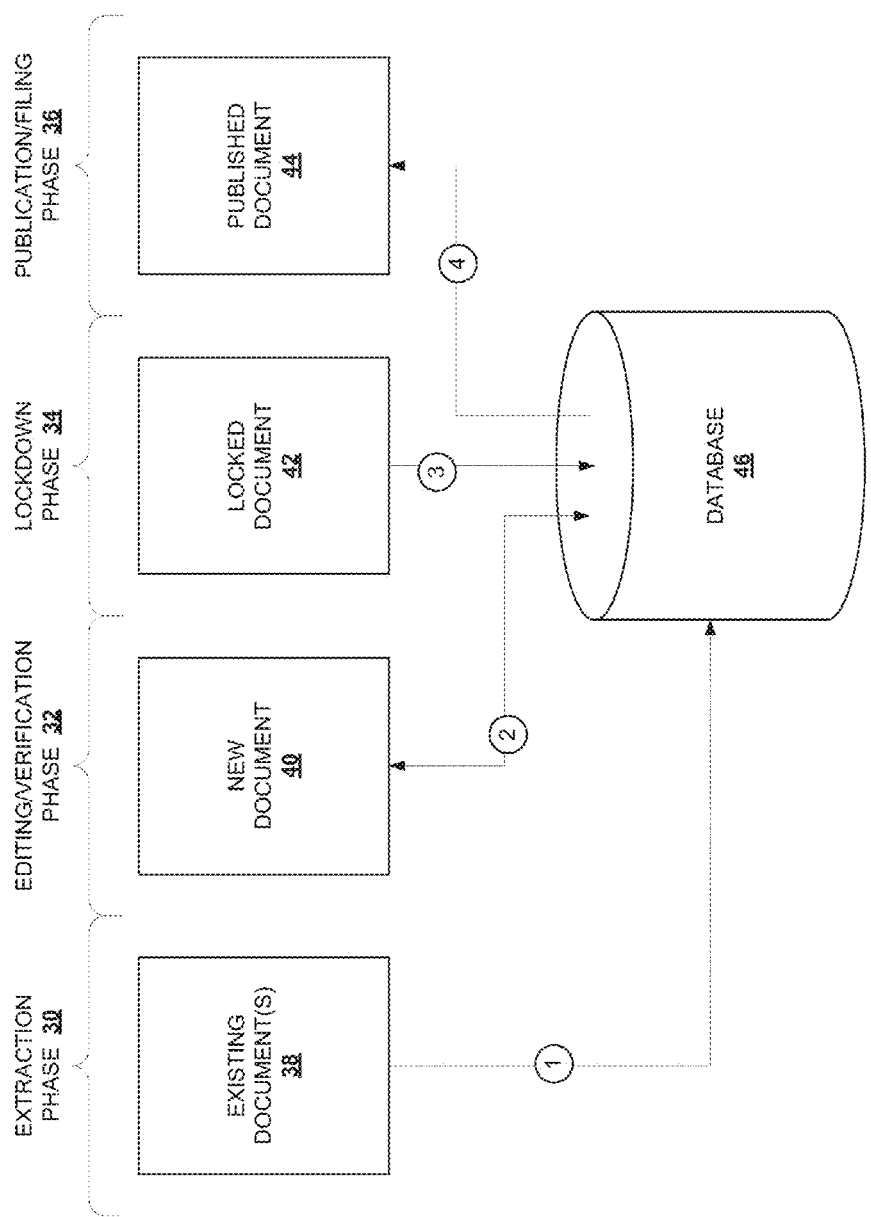
FIG. 3 is a block diagram that illustrates an example of the document processing flow that may occur with a document preparation application having an integrated data annotation tool, according to an embodiment of the invention.

FIG. 3 illustrates an example of the document processing flow that may occur with a document preparation application having an integrated data annotation tool, according to an embodiment of the invention. As illustrated in FIG. 3, consistent with one embodiment, processing data to generate a document that conforms to the requirements of a particular government regulatory agency includes four distinct phases. In phase one 30, data from an external database or from one or more existing documents 38 are extracted by the document preparation application and stored in a database 46 of the document preparation application. During the extraction phase 30, the extracted data may be filtered and manipulated so that the data can be properly formatted and inserted into the database 46 in a manner that is useful to the document preparation application.

The second phase 32 of the document preparation process involves generating a new document 40 based on a document template, and then enabling users of the document preparation application to access, edit and verify various elements of the newly created document 40. It is during this second phase 32 when users of the document preparation application will utilize the data annotation tool to position various tick mark symbols and associated meta-data throughout the document. The exact workflow that is utilized during the editing and verification phase is often dependent upon internal document preparation procedures of the enterprise that is utilizing the document preparation application and data annotation tool. For example, a first team of internal accountants may initially edit the document before a second team of accounts performs a verification process to verify the accuracy of various elements of the document. In any case, during the editing and verification phase 32, users of the document preparation application can use the data annotation tool to place tick mark symbols next to various items of data displayed in the document. These tick mark symbols attach to the particular items of data. Consequently, the tick mark symbols are displayed when any user requests a document that includes that particular item of data. This allows a first user to quickly convey information about a particular document element to another user, and so on. If, for example, a first user has verified the accuracy of a data item in a particular document, adding a tick mark symbol to the data item will convey to other users that the data item has already been verified. In this way, work duplication can be kept to a minimum without sacrificing quality controls.

At some point in the document preparation process, after the document has been edited and verified, the document is determined to be in a finalized state (e.g. ready for printing, publishing or filing with a regulatory agency). Accordingly, during the third phase 34—the lockdown phase—the document is automatically verified and a locked document 42 is created. For example, in one embodiment, all document elements or items of data with corresponding tick marks are automatically verified to ensure that they have not changed since the corresponding tick mark was placed. As described in greater detail below, this generally involves processing a tick mark rule associated with the tick mark. In one embodiment, a tick mark rule is considered to be satisfied if the item of data with which the tick mark is attached has not been modified since the time the tick mark was initially generated and placed. Only if each tick mark rule is satisfied is the document locked. Once the document is locked, users of the document preparation application are generally prohibited from accessing a writable copy of the document, or any data included in the document. Accordingly, the underlying data, which may be stored separately in the database 46, are locked (e.g., stored in a non-writable manner) and associated with the locked document. If a user attempts to access an item of data that is included in the document, the user may be provided a read-only copy of the item of data, but cannot modify the item of data.

Finally, during the publication and filing phase 36, a final copy of the document is generated (e.g., a published document 44). In one embodiment, the document preparation application may process the data included in the document in order to filter out any visible or invisible meta-data, including tick mark symbols. In one embodiment, the document preparation application or the data annotation tool may have an administrative interface that enables a user to select various levels of meta-data filtering to be used when processing the data to generate a final published document. In some cases, for example, it may be necessary to "strip" all meta-data from the document. This may be required, for example, when printing a physical hard copy of a document that is to be submitted in hard copy form, or, when generating an electronic or soft copy that may have sensitive meta-data that would be undesirable to provide to a third party. However, in other cases, it may be beneficial to leave machine-readable meta-data within an electronic or soft copy of the document, while removing any user-viewable meta-data. Accordingly, the meta-data filtering mechanism can be customized or tailored to fit the requirements of the entity for which the document is being generated. Finally, in one embodiment of the invention, the document preparation application may include logic for facilitating the automatic or semi-automatic submission or filing of a document to an online filing system operated by a regulatory agency. This may occur during the publication/filing phase 36.

Figure 4:
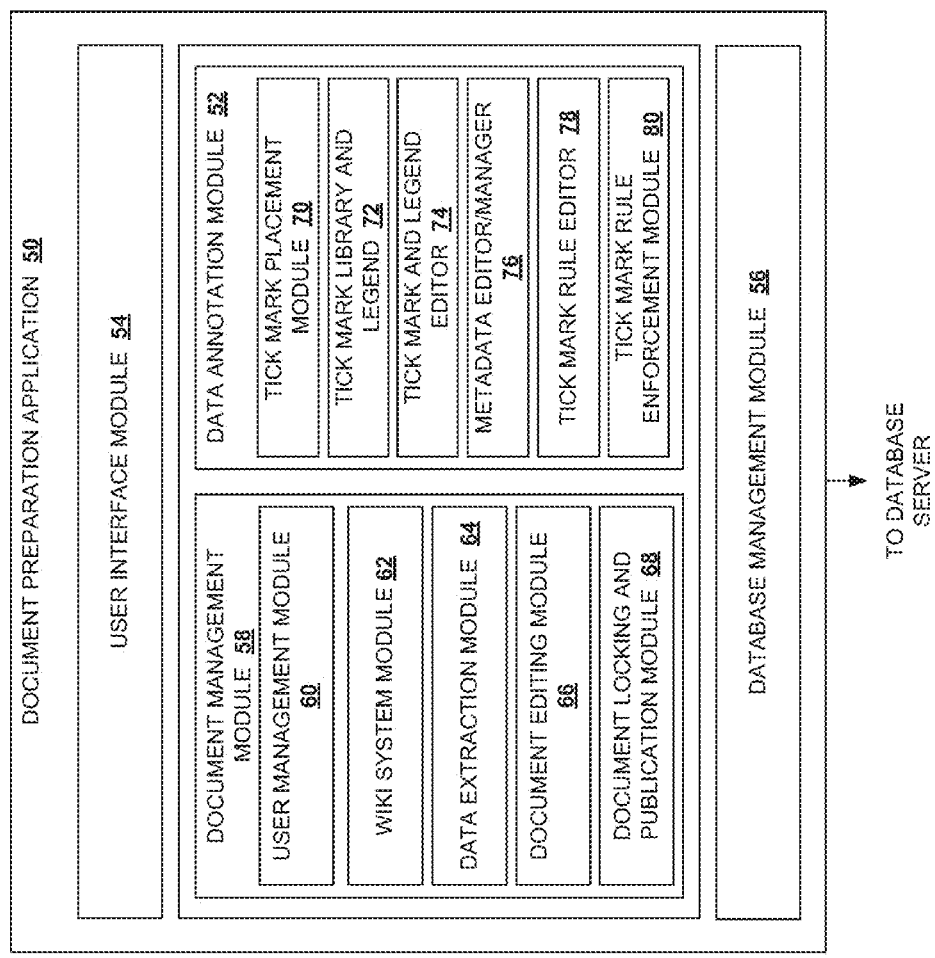
FIG. 4 is a functional block diagram illustrating various functional components of a document preparation application with an integrated data annotation tool for generating and utilizing electronic, persistent tick marks with electronically stored data, according to an embodiment of the invention.

FIG. 4 is a functional block diagram illustrating various functional components of a document preparation application with an integrated data annotation tool for generating and utilizing electronic, persistent tick marks with electronically stored data, according to an embodiment of the invention. Although aspects of the invention might be implemented in hardware, software or a combination thereof, each module or functional component illustrated in FIG. 4 represents an executable code module (e.g., a set of instructions) consistent with an embodiment of the invention. The code modules depicted in FIG. 4 may reside on an application server 24 or a user-computer 20, and may be executed by either an application server 24 or a user computer 20. For example, in a client-server framework, some of the code modules will reside and execute on a client (e.g. user computer 20) and some will be reside and execute on an application server 24. In any case, when executed, the various code modules perform the functions described below.

As illustrated in FIG. 4, in one embodiment, the data annotation tool for generating tick marks may be integrated with a document preparation application 50. For instance, in FIG. 4 a data annotation module 52 (representing the executable code or logic portion of the data annotation tool) is shown to be a sub-component of the document preparation application 50. As such, the data annotation module 52 is shown to be integrated with the document preparation application 50. Those skilled in the art of software design will readily recognize that the data annotation module 52 of FIG. 4 may be implemented as a stand-alone application, or as a plug-in, or in some other form such that it can be used in conjunction with a conventional document processing application.

Referring to FIG. 4, the document preparation application 50 includes a user interface module 54, a database management module 56, a document management module 58, and a data annotation module 52. In general, the user interface module 54 provides the logic necessary for causing internet documents to be displayed on a user computer. Accordingly, in one embodiment, the user interface module 54 may serve as an interface to a collection of data content, including internet or World Wide Web documents, or portions thereof. The user interface module 54 may, for example, interface with a web server or content server (not shown) such that the internet documents are served to a user computer by the web server or content server in response to a request for content. In addition, the user interface module may provide an administrative interface to either the document preparation application or the data annotation tool, or both. The administrative interface, for example, may allow an administrator to customize various features and establish configuration settings for different aspects of the document preparation application 50 and the data annotation tool.

The database management module 56 may serve as an interface to one or more database servers 26, and in turn, one or more databases 46. Accordingly, data that are processed by the various functional components of the document preparation application 58 and/or data annotation module 52 may be stored in, or retrieved from, a database 46 via the database management module 56.

The document management module 58 includes application logic for managing, processing, editing and presenting data, and in particular, data in the form of documents. As illustrated in FIG. 4, the document preparation application 50 includes a user management module 60. In one embodiment, the document preparation application 50 is a role-based, multi-user system. Accordingly, the user management module 60 provides logic for establishing authentication information (e.g., usernames and passwords) for users, authenticating users based on the authentication information, and enforcing the various access privileges associated with the authentication information of each user. For example, in a role-based system, each user may be assigned a role that determines his or her access privileges for accessing data and performing various operations facilitated by the document preparation application 50. Accordingly, different roles may be created for internal accountants, managers, external auditors and so on. Based on the access privileges associated with a role assigned to a particular user, the particular user may be allowed to edit certain data and annotate the data, for example, by associating a tick mark with the data. Additionally, access privileges may be associated with other administrative and non-administrative features of the application, such as creating customized tick mark symbols within a particular tick mark library, managing (e.g., by adding to, or modifying) the tick mark legend associated with a particular tick mark library, editing the default metadata that is automatically associated with a tick mark symbol, locking a document, and/or publishing, printing or filing a document.

In one embodiment, the document preparation application 50 is a collaborative system. As such, the document management module 58 includes a collaborative system module 62. In general, collaborative software is a type of collaborative software that runs a collaborative system, allowing content (e.g., documents or web pages) to be created and edited using a conventional web browser application. A collaborative document preparation system may be implemented on or with an application server that is integrated with one or more web servers. With a collaborative document preparation system, the content is typically stored in a file system, and changes to the content are stored in a relational database management system. As users edit and modify various document elements, any changes are captured in such a way as to allow the changes to be displayed, along with the time when the changes were made, and the source of the change (e.g., the name or username of the user who made the change).

Referring again to FIG. 4, the document management module 58 includes a data extraction module 64, a document editing module 66 and a document locking and publication module 68. As described in connection with FIG. 3, in one embodiment, preparing a document with the document preparation application 50 is a four phase process. For instance, as illustrated in FIG. 3, the four phases include an extraction phase 30, an editing and verification phase 32, a lockdown phase 34, and a publication/filing phase 36. During the extraction phase 30, the data extraction module 64 (of FIG. 4) extracts relevant data from one or more existing documents 38 and/or external databases. If, for example, an enterprise has previously prepared a document for filing with a regulatory agency, data from the document may be extracted to be used within a new document. In one embodiment, a document template provides a basic document structure and includes references to document elements or items of data that are stored within the database. Those document elements may originate, for example, from the data extraction phase 30. Accordingly, the data extraction module 64 identifies relevant data, extracts that relevant data, filters the data and stores the relevant data in a database for use within one or more new documents.

As illustrated in FIG. 4, the document management module 58 includes a document editing module 66. During the second phase 32 of document preparation the document editing module 66 enables a user to display, edit and verify data in various documents. It is during the editing and verification phase 32 when tick mark symbols may be associated with various items of data or document elements. Once a new document 40 has been established, users may edit and or verify various elements within the document. In one embodiment of the invention, the document editing module 66 operates in close conjunction with the wild system module 62 to ensure that all edits to the new document are captured in a database 46. During this phase, users may insert tick mark symbols that will attach to certain document elements. For instance, a user may select a particular tick mark symbol from a library of tick mark symbols to convey some particular information about the document element with which the tick mark is associated. Accordingly, other users of the application who are familiar with the various tick mark symbols will quickly ascertain the meaning of the tick mark symbol as it relates to the particular corresponding document element or item of data.

At some point in the document preparation process, all of the essential data are entered and appropriately verified. At this time, the third phase—the lockdown phase 34—is entered. The document management module 58 includes a document locking and publication module 68. The document locking and publication module 68 facilitates "locking" a document and its corresponding data so as to prevent any further changes to the document and its data. During the lockdown phase 34, all of the tick mark rules associated with tick mark symbols included in the document may be executed to ensure that no data has been modified since the time when a tick mark symbol was associated or attached with that item of data. If a tick mark rule is satisfied (or fails, depending on how the condition of the rule is stated), indicating that a value for an item of data has changed since the initial tick mark was first generated and placed, the document locking operation is temporarily suspended and one or more users may be notified. For example, a message or email may be communicated to a certain administrative user(s) of the document preparation application 50 to inform the user that a lock down operation has failed. This provides the user with an opportunity to re-verify an item of data displayed in the document.

The document locking and publication module 69 may also enable a user to lock a document element or item of data during the editing and verification phase 32. For example, in one embodiment, document elements may be locked without locking the entire document. If, for example, a user has verified a particular document element and would like to prevent any changes to the document element, the user can lock that document element without affecting any other portions of the document. By locking the document element, the document element essentially becomes read-only.

The data annotation module 52 includes the various code modules associated with and implementing the functionality of the data annotation tool. For instance, as illustrated in FIG. 4, the data annotation module 52 includes a tick mark placement module 70, a tick mark library and legend 72, a tick mark and legend editor 74, a metadata editor and manager 76 a tick mark rule enforcement module 80 and a tick mark rule editor 78.

The tick mark placement module 70 provides the functionality for generating and placing a tick mark within a document, and attaching the tick mark symbol to a particular item of data. This includes, for example, interpreting user input received at a user computer to determine which item of data within a document a tick mark symbol is to be associated with, making the association, and storing a representation of the tick mark symbol in such a way that ensures the persistent nature of the tick mark. In addition, the tick mark placement module 70 automatically associates any system-supplied meta-data with the tick mark.

In one embodiment, the tick mark library and legend 72 include the logic and data for managing, storing and organizing the various tick mark symbols or graphical icons, and their corresponding definitions. For example, the tick mark library 72 may provide a variety of default tick mark symbols that can be placed within a document. Each tick mark symbol may have its own meaning. For example, one tick mark symbol, such as a simple checkmark, may be used to indicate that an item of data displayed within a document has been verified. Accordingly, a checkmark symbol displayed next to a number representing the value of an enterprise's accounts receivable may indicate that the user who placed the checkmark symbol has verified the accuracy of the number representing the value of the accounts receivable. Of course, the number and meaning of the tick mark symbols is dependent upon a particular implementation and the context in which the document preparation application is being used. The tick mark symbols and their meanings will likely be different in the context of preparing a document to be filed with the SEC as compared with preparing a document for some other purpose.

The user interface 54 of the document preparation application may provide access to the tick mark library and legend 72 in a variety of ways. For example, a tool bar, or drop down menu present in the main window of the application may provide a link to a user interface element displaying the various tick marks available to a user, and their corresponding meanings. In one embodiment, the user interface element displaying the tick mark symbols may be a window, frame or information box.

Although depicted in FIG. 4 as a single tick mark library and legend 70, in one embodiment, multiple tick mark libraries and legends may exist. For example, in an embodiment of the document preparation application provided as a subscription service, each enterprise that subscribes to the service may be assigned its own tick mark library. Initially, the tick mark library may be populated with a variety of default tick mark symbols. However, over time, additional tick marks may be added to the tick mark library. New tick mark symbols may be generated and defined using the tick mark and legend editor 74. For instance, the tick mark and legend editor may provide a tool for customizing the look of a graphical symbol. In addition, a custom definition may be assigned to each custom tick mark symbol. Accordingly, users may generate custom tick mark symbols to convey whatever type of information they desire. The tick mark legend 72 provides a user-viewable definition for each tick mark symbol included in a tick mark library. Accordingly, if a user is not immediately familiar with the meaning of a particular tick mark, a user may access the tick mark legend to view a definition associated with a given tick mark. Accordingly, if a user has created a custom tick mark to convey some information, for example, the user can include that information about the tick mark in the tick mark legend 72. In one embodiment, creating custom tick marks and adding corresponding definitions to the tick mark legend 72 is allowed only by a user with special access privileges, such as an administrator of the application. In an alternative embodiment, any user, subject to access privileges, may be allowed to generate a custom tick mark symbol and definition.

When a user attaches a tick mark to a particular item of data or document element, additional meta-data beyond the tick mark are automatically generated and associated with the item of data or document element. For example, in one embodiment, each time a tick mark is placed in a document, the name or username of the user who placed the tick mark is automatically associated with the tick mark symbol and the corresponding document element. Additionally; a time stamp indicating the day and time the tick mark symbol was generated and placed is also automatically associated with the tick mark symbol and corresponding document element. Accordingly, when a tick mark symbol is displayed in a document, the additional automatically generated meta-data associated with the tick mark symbol can also be viewed. For example, a pop-up or fly-out window may appear when a mouse-over event is detected, such that the pop-up or fly-out window displays the additional meta-data, such as the username of the person who placed the tick mark symbol and the day and time it was placed. In one embodiment, a pop-up or fly-out window that is presented during a mouse-over event may include a link to the definition of a tick mark as included in the tick mark legend.

In addition to meta-data that is automatically generated by the data annotation tool, in one embodiment a user may provide additional meta-data that may be displayed in a pop-up or fly-out window. For example, a user may provide a comment or note providing additional information about why the tick mark symbol has been associated and attached to the corresponding item of data. In addition, the user may provide a link to some external item of data. For instance, a hyperlink to an external document or data source may be provided, such that the hyperlink is displayed in a pop-up or fly-out window when a user manipulates a cursor to interact with a tick mark symbol (e.g., a mouse-over event).

The meta-data editor/manager 76 provides logic to facilitate managing and editing the meta-data associated with each tick mark symbol. For example, using the meta-data editor/manager, a user can select the type of meta-data that is automatically associated with a tick mark symbol and displayed with the tick mark symbol when the tick mark is presented in a document. For example, in certain scenarios, anonymity may be desired. Accordingly, an administrator can select whether or not the username of the person that placed the tick mark should automatically be added as an item of meta-data. In addition, the meta-data manager 76 may allow an administrator or user to determine whether or not additional user-provided meta-data is allowed to be associated with a particular tick mark symbol, or type of tick mark symbol.

In one embodiment, a tick mark rule editor 78 provides the logic for generating and associating tick mark rules with different tick mark symbols. A tick mark rule is a rule, specified in one embodiment as a condition and action pair, such that when the condition is satisfied, the action is performed. Tick mark rules are used primarily to ensure that data associated with a tick mark symbol are not unknowingly modified. In one embodiment, each tick mark symbol is associated with a default tick mark rule. The default tick mark rule may, for example, indicate that whenever the item of data associated with the tick mark changes, the tick mark symbol displayed with the item of data is to be modified when presented with the modified item of data. For example, a tick mark symbol when initially attached to an item of data may be a particular color, such as green. The tick mark rule may indicate that the color of the tick mark symbol is to be modified if the value of the item of data is modified. Accordingly, any change to the value of the item of data will cause the tick mark symbol to be displayed in a different color, for example, the color red, as opposed to its original color green. Hence, a user viewing a document that includes a red tick mark symbol next to an item of data will immediately recognize that the red tick mark symbol indicates that the item of data has been modified since the original tick mark was placed. If desired, the user can investigate what caused the change to the item of data, and if necessary, verify that the modified data is accurate. In some embodiments, in addition to changing the color of a tick mark to indicate a change to an item of data, the actual symbol or shape of the graphic that represents the tick mark may be modified to indicate that an item of data has changed. For instance, a "+" or "−" symbol may be shown in conjunction with another symbol to indicate that a value has increased or decreased. In yet another example, the shape or symbol may change altogether to indicate a change has occurred to an item of data.

The tick mark rule editor 78 can be used to specify the condition part of the rule, as well as the action. For example, in one embodiment, the condition can be established such that any change in a document element will automatically satisfy the condition, and thus, cause a modified tick mark symbol to be displayed. Alternatively, when dealing with numbers, a condition may be specified such that only a substantial difference (as specified in the rule) will satisfy the condition portion of the tick mark rule. This is useful, for example, when dealing with values that are derived with formulas and negligible changes are detected in the derived values. For example, if the value of an accounts receivable changes from "$1,987,345.12" to "$1,987,345.10", representing a difference of only two cents, this change may be considered negligible and not necessitate a change in the tick mark symbol that is displayed in the document with the accounts receivable. Accordingly, in one embodiment, the condition portion of a tick mark rule can be customized in a variety of ways.

In addition to specifying the condition portion of a tick mark rule, a rule editor 78 may be used to specify the particular action to be taken should the condition of a rule be satisfied (or not satisfied). Generally, the action specified will indicate a particular tick mark symbol to be displayed if a condition is satisfied (or not satisfied). For example, as noted above, an action may specify that a tick mark symbol of a different color is to be displayed if the value corresponding with the tick mark changes. Instead of displaying the same tick mark symbol in a different color, a tick mark rule may specify that an all together different tick mark symbol is to be displayed if a document element has changed. For instance, a check-plus symbol (a checkmark with a "+") may be used to convey some information about a corresponding item of data. In this case, the checkmark symbol may indicate that the corresponding value has been verified, while the "+" portion of the symbol indicates that the value of the document element or item of data has not been modified since the tick mark symbol was initially placed. If, however, the value is modified, the tick mark symbol may be modified as well. For instance, a check-minus (a checkmark with a "−") may be used to indicate that a value was originally verified but has since changed. The check-plus and check-minus symbols presented herein are simply provided as examples. Those skilled in the art will immediately recognize that any number, variety, color, and shape of symbol might be used as tick mark symbols, consistent with an embodiment of the invention, to visually convey information.

The tick mark rule enforcement module 80 evaluates tick mark rules, and performs an action specified in a tick mark rule when a particular condition is satisfied (or not satisfied). Accordingly, when a document is requested, or when a data query is processed, the requested data is analyzed to determine whether the data has been associated with a tick mark symbol. If a tick mark symbol has been associated or attached to the particular item of data, the tick mark rule enforcement module 80 evaluates the tick mark rule associated with the tick mark to determine if the condition portion of the rule has been satisfied in this case, a satisfied condition indicates that a document element has been modified since the time when the initial tick mark symbol was attached with the value. Of course, in an alternative embodiment, a condition may be specified such that the condition is satisfied if a corresponding value has not been changed. In any case, the tick mark rule enforcement module 80 ensures that the proper tick mark symbol is displayed in a document, and/or with an item of data, based upon any changes that may have occurred to the document or data.

Although not depicted in FIG. 4, in one embodiment of the invention, a query processing tool may be included as a component of the data annotation module 52. In general, the query processing tool enables a user to specifically query a database for individual items of data or document elements, without requesting the entire document. For example, a user may desire to view a list of document elements, without actually viewing the document. The query processing tool provides this functionality. When a document element or item of data satisfying the query is associated with a previously placed tick mark symbol, the tick mark symbol and any associated meta-data is returned in the results of the query. In addition to querying data included in documents, an embodiment of the query processing tool may also facilitate the querying of meta-data. For instance, using the query tool, a user may specify that a list be generated to include all document elements that have been tagged with a tick mark symbol by a particular user. Similarly, a query may request a list of document elements that were tagged with a tick mark symbol during a specified time period. Again, the underlying document elements and any meta-data, including the tick mark symbol, will be displayed in the results of such a query.

Figure 5:
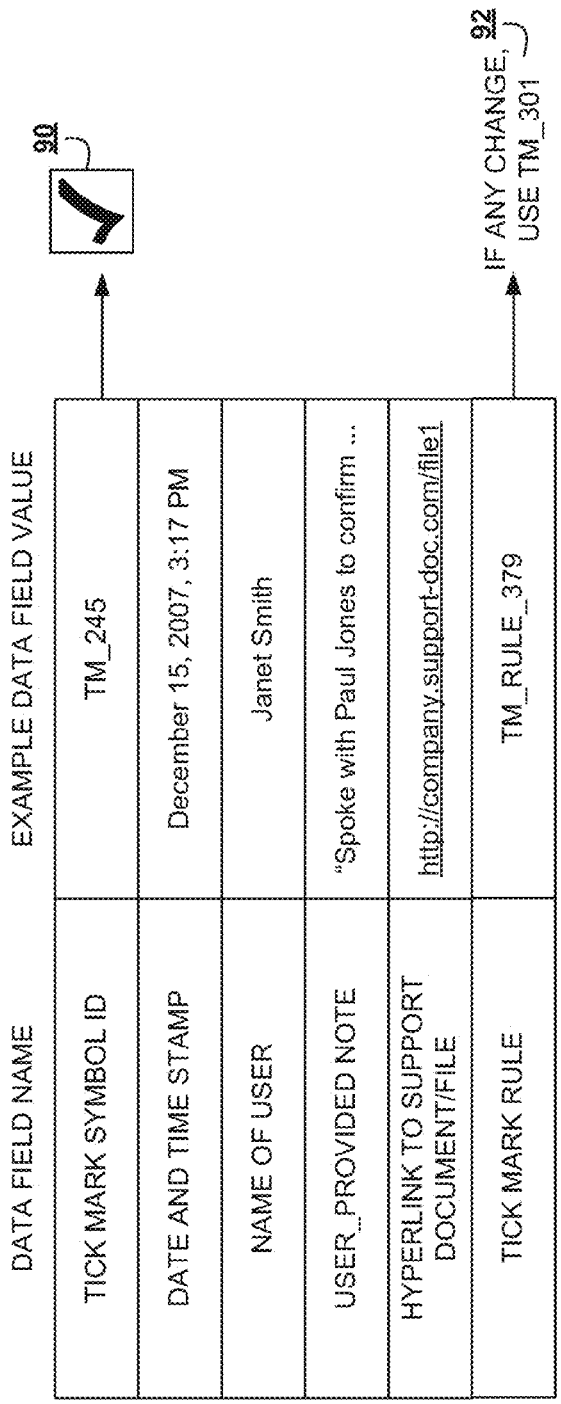
FIG. 5 is a block diagram of an example data structure for use in representing an electronic, persistent tick mark, according to an embodiment of the invention.

FIG. 5 is a diagram of an example data structure for use in representing an electronic, persistent tick mark, according to an embodiment of the invention. The data structure shown in FIG. 5 is provided to illustrate the nature of the data, in contrast to any particular format. In one embodiment, for example, the data comprising a tick mark may be stored as an XML tag that conforms to a particular standard, such as the XBRL (eXtensible Business Reporting Logic) specification, or any other XML-based standard. Alternatively, the format of the data may be dependent upon a programming language used to implement the data annotation tool. Those skilled in the art will readily appreciate the various structures and formats that might be utilized in representing a tick mark consistent with aspects of the invention.

As illustrated in FIG. 5, the data structure representing a tick mark symbol includes five data field names with corresponding example data field values. The first field, referred to in FIG. 5 as the "TICK MARK SYMBOL ID" indicates the specific graphic symbol that is to be displayed. For example, the field value may be a graphic symbol identifier, such as "TM_245", which identifies a graphic symbol in a tick mark library. In the example of FIG. 5, the tick mark identifier, "TM_245", corresponds with a checkmark symbol 90.

The second field in the example data structure of FIG. 5 is used to store system-supplied meta-data indicating the day and time that the tick mark symbol was attached to the item of data (e.g., originally placed in the document). For example, in FIG. 5, the "DATE AND TIME STAMP" field is shown to have the value "Dec. 15, 2007" indicating that the representative tick mark was generated and/or attached to an item of data on Dec. 15, 2007. The third field in the example data structure of FIG. 5 is also a system-supplied meta-data item. The field referred to in FIG. 5 as "NAME OF USER" indicates the name of the user, Janet Smith, who attached the tick mark symbol to the corresponding item of data.

The next two data fields are examples of user-supplied meta-data. For example, the data field with name "USER PROVIDED NOTE" is used to store a note or comment provided by the user. Similarly, the field in FIG. 5 with name "HYPERLINK TO SUPPORT DOCUMENT/FILE" stores a hyperlink to a supporting data source, such as a document.

Finally, the last field of the data structure illustrated in FIG. 5 is a field for storing a reference to a tick mark rule. In this example, the field "TICK MARK RULE" has a value "TM_RULE_379" which references a particular tick mark rule. As indicated by the text with reference number 92 in FIG. 5, the tick mark rule indicates that any change in the data item with which the tick mark is attached, causes the tick mark symbol with tick mark associated with tick mark ID, TM_301" to be displayed, when the item of data is displayed. Of course, a variety of additional meta-data may be included in a data structure representing a tick mark symbol according to an embodiment of the invention.

Although the data structure in FIG. 5 shows the tick mark rule as a component of the data structure for the tick mark symbol, in an alternative embodiment, a default rule may be used. As such, the tick mark rule need not necessarily be included as a field in the data structure representing the tick mark symbol.

Figure 6:
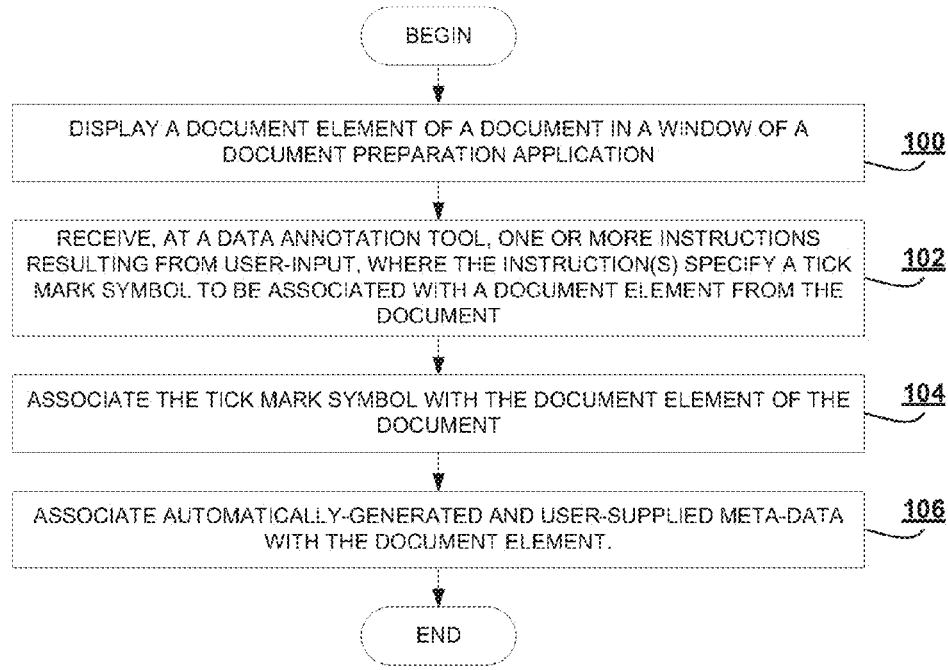
FIG. 6 is a flowchart that illustrates a method, according to an embodiment of the invention, for displaying data in a document, where the data has associated with it a tick mark symbol and associated meta-data.

FIG. 6 illustrates a method, according to an embodiment of the invention, for attaching a tick mark symbol and associated meta-data to an element of a document. The method begins at operation method 100 when the document preparation application causes a document to be displayed in the application window. This may include, for example, an application or web server serving the document to a user computer (e.g., client), which receives, renders, and displays the document. Alternatively, in an embodiment implemented as a standalone application, the lone computer may execute the instructions that cause the document to be displayed. In any case, at method operation 102, a data annotation tool receives one or more instructions specifying a tick mark symbol to be associated with a document element from the document displayed in the document preparation application window. The instruction(s) may result, for example, from a user manipulating a pointing device (e.g., mouse) and interacting with a graphical user interface.

At method operation 104, the data annotation tool processes the instructions causing the tick mark symbol to be associated with the document element. This may include, for example, modifying an XML tag to include the tick mark symbol, or alternatively, generating a new XML tag, or other data structure. In addition, a tick mark rule may be associated with the document element and its corresponding tick mark symbol. Finally, at method operation 106, automatically-generated meta-data and/or user-generated metadata may be associated with the document element and its corresponding tick mark symbol. For example, a date and time stamp may be automatically generated and associated with the tick mark symbol. Additionally, a user-generated note may be associated with the tick mark symbol and corresponding document element.

Figure 7:
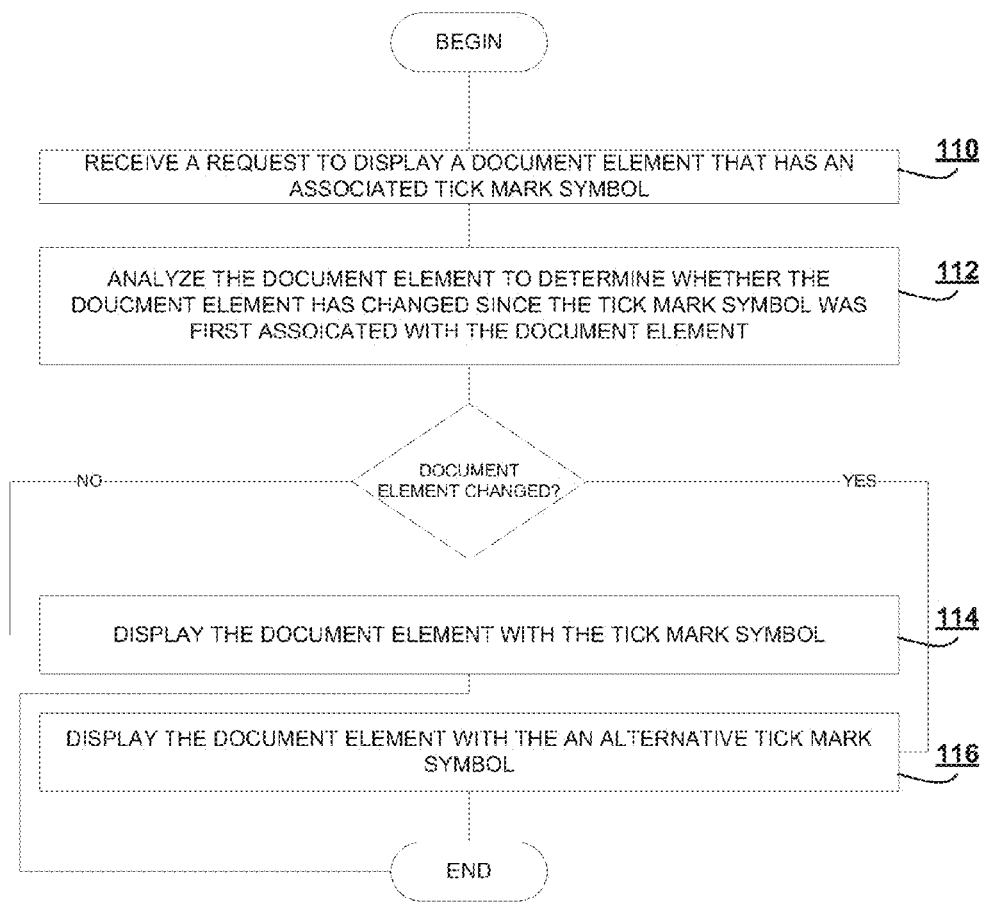
FIG. 7 is a flowchart that illustrates a method, according to an embodiment of the invention, for attaching a tick mark symbol and associated meta-data to an element of a document.

FIG. 7 illustrates a method, according to an embodiment of the invention, for displaying data in a document, where the data has associated with it a tick mark symbol and associated meta-data. The method begins at method operation 110, when a request is received to display a document element that has an associated tick mark symbol. The request may be a document request, or alternatively, a query from a query tool. At method operation 112, the document element is analyzed to determine whether the document element has changed since the tick mark was initially associated with the document element. This may be achieved, for example, by processing a tick mark rule.

At method operation 114, if the document element has not changed since the tick mark symbol was associated with the document element, then the document element and the tick mark symbol are presented in accordance with the request. However, at method operation 116, if the document element has changed since the tick mark symbol was originally associated with the document element, then the document element and an alternative tick mark symbol are presented to the requesting user. The alternative tick mark symbol may be specified in a tick mark rule, and generally will convey to the user that the corresponding document element has been modified at some point since the tick mark symbol was initially associated with the document element.

It will be appreciated that in the method presented in FIG. 6, the operations may occur in a different order. For example, the analysis to determine that a document element has changed may occur prior to the request to display the particular document element. In such a case, the request can be processed to display the proper tick mark symbol based on the previous analysis of the document element.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. Accordingly, the modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or as a service, for example, such as in the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Figure 8:
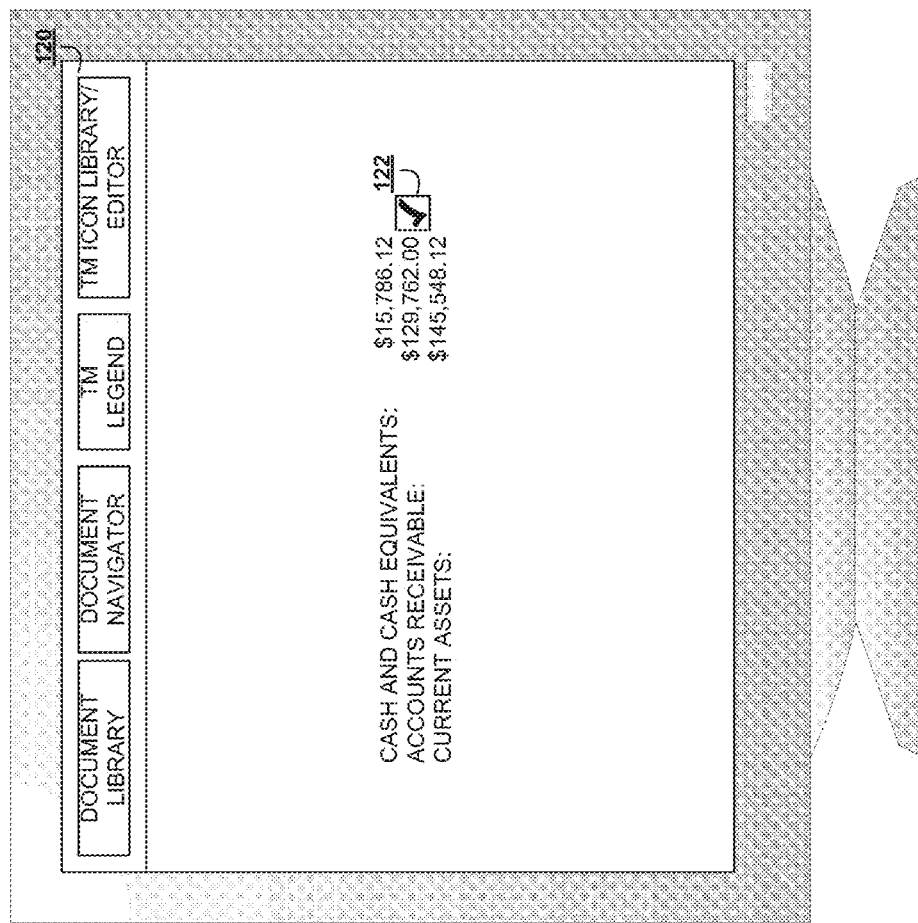
FIG. 8 is a screen shot of an example user interface according to an embodiment of the invention.
Figure 9:
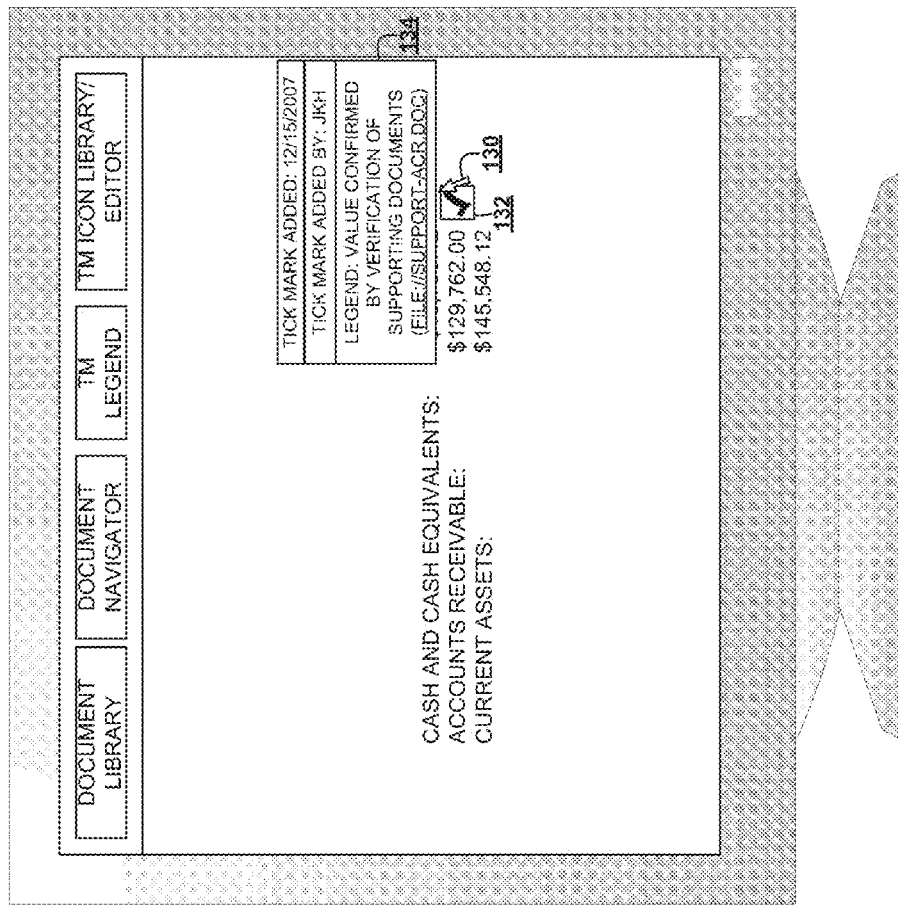
FIG. 9 is a further example screen shot illustrating an example user interface that may be utilized in an embodiment of the invention.

FIGS. 8 and 9 illustrate example graphical user interfaces (GUIs) that may be utilized in an embodiment of the invention. The example GUIs shown in FIGS. 8 and 9 are provided to convey to the reader an understanding of how one particular implementation of a document preparation application with an integrated data annotation tool may look and function. As such, the example user interfaces shown in FIGS. 8 and 9 are not to be construed as limiting the invention. In FIG. 8, a portion of a financial document is displayed in the main window of a document preparation application. In this example, the document preparation application includes a menu or tool bar 120 located in the top portion of the main window. Within the main window, there are three line entries, including an accounts receivable entry with a corresponding value of "$129,762,00". In this example, a tick mark symbol in the form a checkmark 122 is shown next to the number representing the value of the accounts receivable. The checkmark may be placed, for example, by manipulating a cursor pointing device (e.g., a mouse). For example, in one embodiment, clicking a mouse button may cause a checkmark symbol to be positioned in the location of the cursor when the button is clicked or pressed. In other embodiments, a tick mark symbol might be positioned by selecting the tick mark symbol from a group of tick mark symbols, and then dragging the tick mark symbol to the desired location within the document. In one embodiment of the invention, a prompt may be shown to the user, requesting the user to verify that the tick mark symbol (e.g., the checkmark in FIG. 8) is to be associated with a particular value displayed in the document (e.g., the accounts receivable value $129,762.00 in FIG. 8).

FIG. 9 illustrates an example of the meta-data that may be displayed in a pop-up or fly-out window, during what is referred to as a mouse-over event, according to an embodiment of the invention. As illustrated in FIG. 9, a user has manipulated a cursor device (e.g., pointing arrow 130) to position the cursor device on top of or near the checkmark symbol 132. This action is detected by the operating system or the web browser application of the user computer and is referred to as a mouse-over event. This mouse-over event causes the tick information pop-up window 134 to appear. In the tick information window 134, various meta-data items associated with the checkmark symbol, and the corresponding data item (e.g., the accounts receivable value), are displayed. For example, as shown in the pop-up window of FIG. 9, a date and time stamp indicates the date and time when the checkmark symbol was placed. In addition, the pop-up window shows the initials "JKH" of the user who placed the checkmark symbol. Finally, the pop-up window shows a legend definition, indicating the meaning of the checkmark symbol. In this case, the legend definition includes a hyperlink to a supporting document that may be associated with or include data on which the accounts receivable value is based.

As described and illustrated herein, various embodiments of a data annotation tool provide a mechanism by which a user can quickly and easily annotate a document element with a tick mark symbol, and associated items of meta-data. The tick mark symbol attaches to the value of the document element or item of data, and provides other users viewing the document with information such as, who placed the tick mark symbol, when it was placed, comments or notes from the user who placed the tick mark symbol, and/or a hyperlink to a supporting data source. Users can quickly identify when a data item has changed, when a modified tick mark symbol is displayed next to an item of data. Additionally, the tick mark symbols may be hidden or removed from a version of the document so the document can be viewed, printed or filed without the tick mark symbols and associated meta-data.

Electronic Support Binders

Focusing now on the use of tick marks extended more broadly to an overarching concept of electronic support binders, one of the significant capabilities of such a system is the ability to easily incorporate, verify, and authenticate data that goes into a report. By way of example, a CEO of a corporation must certify that an annual Securities and Exchange Commission (SEC) form 10-K (an Annual Report) filing is accurate. However, there is a large amount of supporting data necessary to complete the 10-K form, and the CEO must rely on others to certify the accuracy of intermediate level data upon which the 10-K form is based. Similarly, those who supply data to the CEO must rely upon others for their information, such that a large hierarchical dependency chain is created.

Difficulties can occur when a high-level document has been created and low-level data that feeds into the high-level document changes. A change of a single value can impact dozens or even hundreds of other values, which, in the paper world, would be painstakingly adjusted and verified. Furthermore, in order to make such changes and verification possible, sufficient time must be allocated at each stage. Historically, this might involve locking down the underlying components for days or even weeks while the necessary integration of lower-level documents can be properly and accurately verified and integrated. Thus, problems associated with the traditional tick/tie are a laborious and time consuming, paper-driven process that makes change management difficult and repetitive, and makes the correct distribution of changes risky.

The use of automated tick marks and the ability to quickly provide the capability to ensure authentication gives users the ability to see whether or not something of significance in a particular area has or has not changed. And for the data that has changed, it shows the user how changes that were made elsewhere and in other documents outside of the one that the user is focused on are linked and interrelated. All of the information that goes into supporting key reports/documents can be automatically linked together electronically, and verification can be achieved without hand-drawn tick marks, and the electronic information, including tick marks, are persistent with the document and the relevant data within the document, thereby giving users confidence to know what has changed and allows them to better trust the data that they've been given.

In sum, the main components of the electronic support binders and related tick-and-tie mechanisms allow an automated or computer-assisted capability for: entering data, linking information between documents, providing a hierarchical certification involving sign-off, and authorization.

A significant advantage of this approach is that the ticks and ties persist in the documents (i.e., they are bound to the electronic documents). When a document is "rolled forward", (e.g., going from a first-quarter report to a second-quarter report), the older document can be used as a template. The references can be left in place, meaning it is just a matter of updating them, not re-creating them and adding the ticks and ties again. It becomes just a matter of updating and adding the supporting documents and creating the tie.

Another use case for the system is attaching evidence (as "attachments") to a document. This concept could be used in any situation where information in one document relies upon evidence from another document. A good example of this is a Sarbanes-Oxley Act (SOX) Test of Controls document.

Figure 10:
FIG. 10 is an illustrative screen shot showing a user interface environment in which an electronic support binder may be accessed.

FIG. 10 is an illustrative screen shot showing a user interface environment in which an electronic support binder may be accessed. A user can select the support binder 273 from a list of documents 272 available to them. FIG. 11 is a screen shot that illustrates an example organizational structure for a support binder 300. The support binder has a name 302, and may be organized into tabs or grouped element identifier 305 as might be a paper support binder. Although not illustrated, it is possible for tabs to be nested, so that a hierarchy of tabs can be provided-this could be accomplished by additional columns shown in the display. Each tab 305 may have one or more documents 310 associated with it. These documents 310 can be in any format: a word processing document, worksheet/workbook, presentation, report, PDF document, or any other format, whether created manually or by a partially or fully automated process.

As defined herein, a "supported document" is a document, as defined above, that contains at least one data item that relies on, is associated with, or is related to, a data item from another document (defined as a supporting document). A "supporting document" is a document, as defined above, that contains at least one data item is relied upon, is associated with, or is related to, a data item in the supported document.

Figure 12:
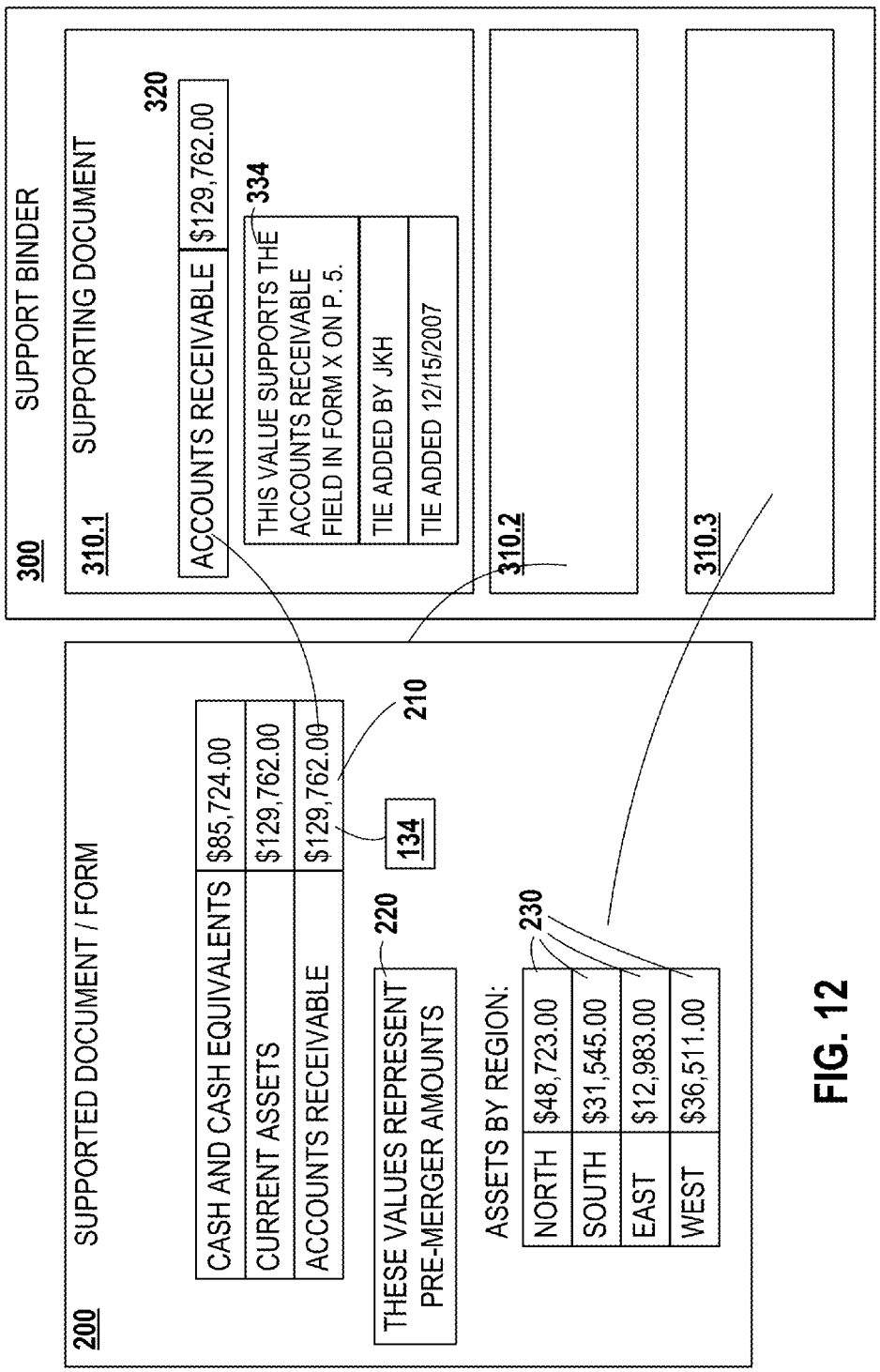
FIG. 12 is a screen shot illustrating both the supported document/form and the supporting document from the support binder.

FIG. 12 is a screen shot that illustrates a very simplistic use case in which a basic supported document 200, similar to that shown in FIG. 9, will be filed with a government agency. FIG. 12 also illustrates the electronic support binder 300 as a database that contains a collection of all supporting documents for the supported document 200. In the example illustrated, the support binder comprises three supporting documents 310.1, 310.2, and 310.3 (generically 310), which will not be filed with the government agency, but which must be preserved in the event of an audit. The supported document 200 comprises several fields, including an accounts receivable field 210, a text field 220, and a range of numbers 230 associated with information in the third supporting document, i.e., all being supported by the support binder 300 and the respective documents 310 it contains.

The support binder 300 comprises first supporting document 310.1 having a first source field 320 that contains the amount that will go into the accounts receivable field 210 on the supported document 200. In an embodiment, it also allows entry of, and can display, corresponding tie information 334, i.e., data indicating where this source data is being used. The first source field 320 can be used in multiple places, and thus, each use can have different tie information. Also illustrated is a second supporting document 310.2 which is used to support a text field 220 on the supported document 200. By way of example, the second supporting document 310.2 could be a memo from the CFO that supports the text field 220 in the form. Finally, a third support document can be provided to support a range of values 230 on the supported document 200.

Although FIG. 12 shows a simple support binder 300 with supporting documents 310, support binders and documents can be quite large and complex. Given the potential complexity of support binders 300 and supporting documents 310, it may be important to identify, in the tick information 134, (and in the tie information 334) not only the filename of the supporting (supported) document, but also the location of the supporting (supported) data. In the most simple approach, the reviewer can manually provide, as a part of the tick annotation 134, the location information within the supporting document 310.1. However, the system is not limited in this manner, and the reviewer may be provided a mechanism for automating, to some extent, the indication of a location within the supporting document. A more extensive embodiment discussed in detail below illustrates user mechanisms for associating this information.

To attach a document, the user can select an entity to associate the document with. This entity can be any type of an object-text, field, image, heading, etc. In the example shown in FIG. 12, the entity is the form field 210 worksheet cell. When the user selects the cell 210, an option is provided (e.g., via right mouse click or other form of menu/selection option) for the user to associate an attachment with the cell 210 (see, e.g., FIG. 13, pop-up menu 240). In FIG. 14, a new attachment window 270 is displayed, permitting association of a document. As shown, a list of available documents 272 is presented that are available for attaching. The ones shown are documents that are internal and managed by the system. However, a dialog box could be added that permits access to external documents on the operating system or over a network.

Figure 15:
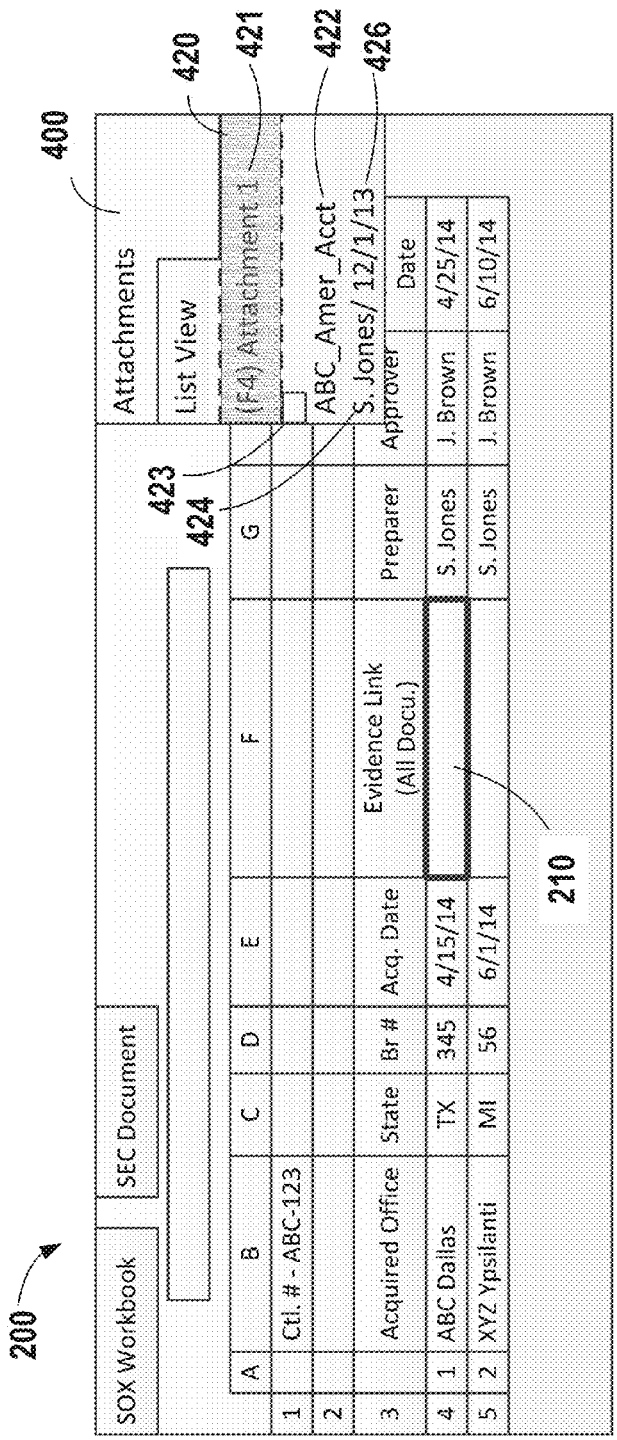
FIG. 15 is a screen shot illustrating an attached document to a supported document field.

Once the user selects a document for attachment, an indicator 420 containing information about the attachment can be shown (FIG. 15). The displayed information could be a location identifier of the entity (here, worksheet cell F4), the filename of the attachment, possibly with a version number and/or file date of creation and/or modification, and possibly its source location, an identifier for the person making the attachment, and a date of attachment.

The most basic form of location information within a binder document is page number, and often times this will be sufficient for audit purposes. For example, a reference could be created that is associated with the annotation 134 indicating the relevant document by its filename ("FILE:// SUPPORT-ACR.DOC") or some identifier associated with the file, and a page number as location information within the document where the specific supporting information can be found.

However, any form of geospatial location information for electronic binders can be utilized, and this can be provided with any form of supporting document 310.1. For example, for a word processing document, coordinate locations could be broken down into any or all of chapter, section, page, paragraph, sentence, line, and word/number (or even characters) with corresponding numeric, alpha-numeric, or binary representation that uniquely defines the appropriate location unit. Any such coordinate location (in any type of supporting document) could be defined as a point ("the start of the first full paragraph on p. 6"), as a range ("paragraphs 1 and 2 on p. 6"), or as a collection or set of points/ranges. For a spreadsheet, this could be a file, tab, column, row, cell, or range of cells. Other types of documents would have coordinate location appropriate for their content; this feature is discussed in more detail below Any form of geospatial information can be provided in text boxes and the like. However a special designated field such as a link or URL could also be included as logical geospatial information, and a predefined data structure could be universal in nature to define any type of document coordinate. In that way, a precise location can be provided for any type of supported field as well as supporting field. The use of a selection is described in more detail below. A selection can be a location point, a location range, or a collection of both. A selection can refer to either a collection of data in the supporting document that supports data in the supported document (i.e., tick data), or a collection of data in the supported document that is supported by data in the supporting document.

The supporting document 310.1 could be interpreted in terms of its physical layout, and thus the location information could be provided in terms of an X,Y coordinate point or a series of X,Y coordinates that bound a particular region, as might be found in an image file, such as a JPEG or scanned PDF file. Sets of points or ranges could be defined as well. The X,Y coordinates could be expressed in terms of real-world measurements (inches, mm) or in terms of the graphical composition (pixels) of the image. Furthermore, when a supporting "document" 310.1 comprises a temporal aspect to it, such as it being an audio or a video file, the coordinates could be expressed in terms of a point or range of times, or sets, respectively, thereof. In a video file, both position and time data could be included.

The documents going into a support binder 300 fall into two primary classifications: those for which the user can fully access and control content/metadata of the document ("internal documents"), and those developed by third parties who do not provide full access for content/metadata ("external documents" or "third-party documents").The significance of this classification dictates possible ways in which the tie information 334 can be properly associated and displayed with the source field 320, 334. For internal documents, the structure of the documents, data fields, and content can be known (actually, defined) by the system, and the tie information 334 (content, display location and format) can be incorporated into the document in an integral manner.

However, for external documents having a proprietary/closed format (e.g., Microsoft Office Documents, particular image, or other data file formats), or even open format files where it is desirable not to change the actual documents' contents, the tie information 334 can be provided in an overlay layer. If possible, the overlay layer can travel with the document (e.g., when the document format permits user-defined meta-data to be associated with it) or it can be provided in an associated document or in the support binder 300 data.

In an embodiment, a link is provided with the annotation information 134 so that a user can select the link and be taken immediately to the supporting document 310.1. In an embodiment, if detailed enough location information is provided, the user may then be taken to the specific place or at least the starting place in the supporting document 310.1 in which the supporting data is located. In other words, the user can have an electronic link in the tick that will navigate them directly to the tie in the source document. This navigation can occur with any level of precision that can be specified by the geospatial or temporospatial designation.

Also, a mechanism for creating a clean document that does not contain the tick information can be created. In other words, one should not file an SEC form that contains the tick annotations. Thus, a switch can be provided to produce output documents that either do or do not contain the tick mark annotations (i.e., data associated with the tick).

One significant advantage of this approach is that a user can go into a form and re-tick and tie a single number on a page without having to re-tick and tie the entire page. Another significant advantage is when a report is being produced. Typically, an accountant will create a report in a word processing document, but rely on a spreadsheet for source data. Very often, numbers from the spreadsheet are repeated in the word processing document, so when a report creator links the numbers from the spreadsheet into the word processing document, a particular number appears many times in the document. If that particular number is one of the numbers that changes, the user will be able to go in and surgically update the tick and tie in a single instance of the number, and the system can take care of automatically updating the rest of the instances of the number/value.

Figure 13:
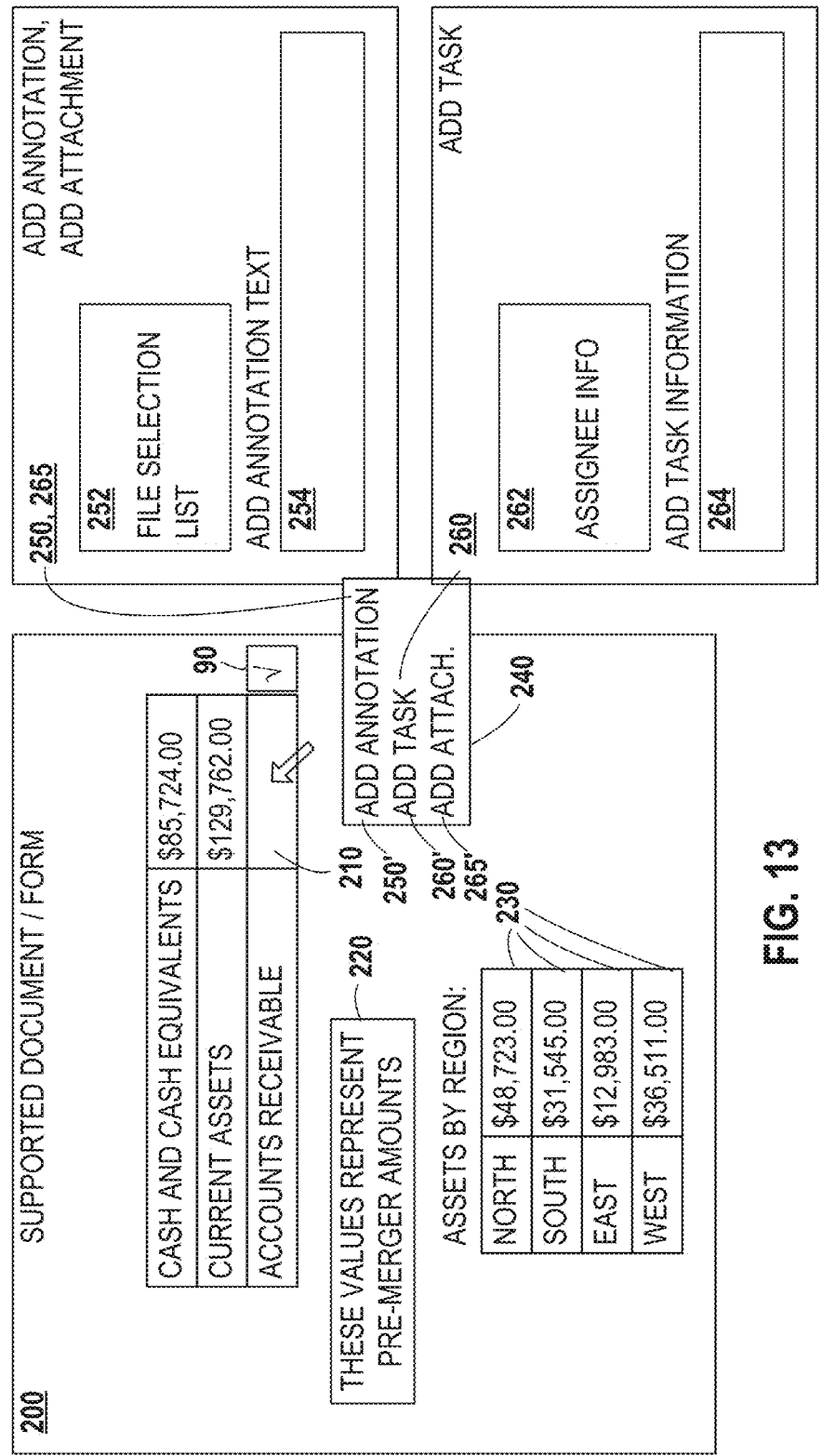
FIG. 13 is a screen shot illustrating the addition of tick information to a filed on the supported document.

FIG. 13 illustrates a simplistic example initiation of adding an annotation to a field in a supported document and associating it with its supporting document. In this example, a user wishing to update the supported document 200 accounts receivable field 210 can select the field and perform, e.g., a right mouse click to display a local popup menu 240 (or, with the field selected, can go to a menu, pushbutton, or other UI element) which provides an option for adding an annotation 250' to the accounts receivable field 210. This selection can cause, e.g., an add annotation window or dialog box 250 to be displayed. A file selection list box 252 is shown, but can be grayed out or not present at all if the add annotation option is chosen, and only provided if the add attachment 265' option is chosen.

The user can enter an annotation using the add annotation text box 254 (e.g., specific location information, relevant comments, etc.). Alternately, or additionally, certain of the annotation text can be added automatically. For example, in FIG. 9, the selected filename and associated legend description could be added by the system once it knows the name/location of the supporting file. Any form of metadata associated with the file could be put into the annotation text field as well. Also, login information could be used to determine the user's initials or other identifying information, and the timestamp for the annotation/tick is known by the operating system as well, so it can be automatically included as meta-data with the tick and tie. FIG. 13 also shows a tick mark 90 that can be provided to persist with the supported document field that can be implemented as described above.

If the add attachment 265' option is chosen, the add attachment popup window 265 can be displayed, which includes the file selection control 252 and the add annotation text control 254. This file selection list control 252 can be, e.g., a specific file list popup window 270 showing a list of files 272 which have been imported into the system to be displayed, it can be a standard operating system file selection dialog box which could permit the user to locate the file at an operating system level and select it, it can be a file located on a network or document database and identified by a link. In an embodiment, a non-system or external files that is selected is imported into the system, and a copy of the file is made and stored in the supporting document database. Once the file is selected, (or if only an annotation is to be associated with the selected field), the text annotation can be provided.

FIG. 15 is an example screen shot showing an attachments window/display 400 with a list (here a single document, by way of example) of attachments associated with the selected field 210. As discussed above, the selected field 210 could be a single document or form entity, a range, or a collection of entities and ranges. An attachment item 420 contains an identifier/indicator 421, a filename 422, a file type indicator or icon 423 (i.e., showing the type of supporting document, such as a word processing document, worksheet/workbook, presentation, video, email, web page, URL, and any referenceable portion thereof etc.), an individual associated with the attaching 424, and an attachment date 426. The attachment item 420 can be an actual attached entity, but can also serve as a placeholder for an item that is to be attached, as illustrated in the various embodiments below.

Figure 16A:
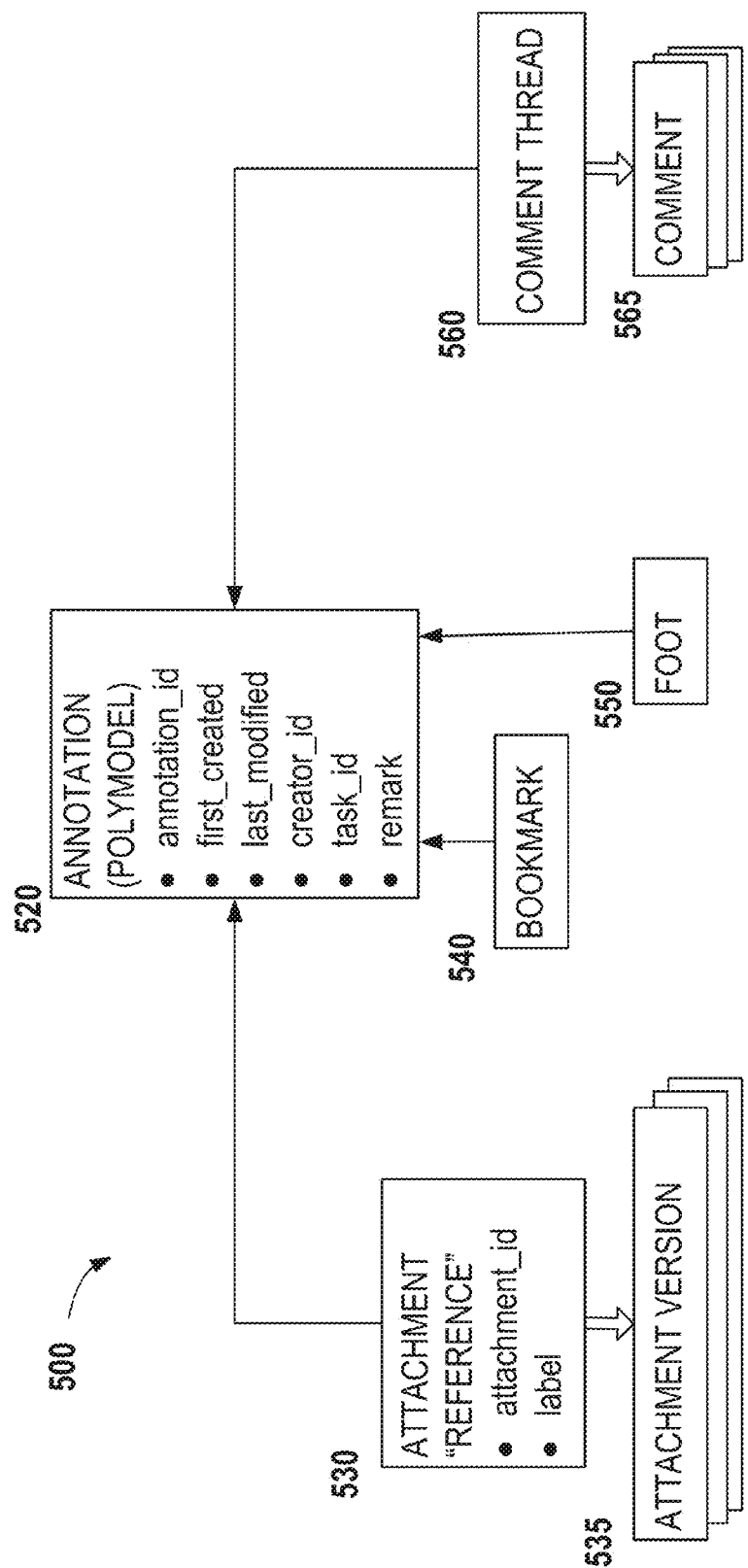
FIG. 16A is a block diagram illustrating an example type definition of an annotation element.

FIG. 16A is a block diagram illustrating the hierarchical structure 500 of a polymodel for an annotation element (the polymorphic behavior is provided as a part of the Google App Engine and as part of the Google SDK). The base annotation element 520 includes an annotation ID, which is a unique identifier for the annotation (and can be pointed to from a selection resource), a date of first creation and last modified (timestamps), a creator ID (e.g., a user ID in the system), and possibly modifier IDs, a task ID, and remark data. It is also possible to incorporate versioning into the annotation element 520 with one or more version IDs or other versioning mechanism. An annotation element 520 can form the base for a number of types of annotations, such as an attachment (described above), a bookmark, a foot, and comment thread. Many different kinds of tick marks are used in accounting to annotate the fact that numbers/data in a report have been sourced or verified. The attachment annotation can provide a way to associate the source document. A "foot" tick mark annotates a verification that a column of numbers has been properly summed An "R" (or similar) type tick mark annotates that the formula associated with the cell has been (manually) recalculated and verified. "PQ" or "PY" tick marks are often used to annotate that numbers are sourced by previous quarter or yearly filings or reports. These are the common tick marks and can be designated as such in the tick mark metadata. Not all tick marks will have a corresponding "tie", but serve more as an "I verified this" designation. The annotations platform may also be the base for annotations other than tick marks. For example, simple bookmarks, marking a user selected location, and threaded comments that provide a way for collaboration are examples of extensions beyond the tick marks for annotation platform.

There are a wide variety of annotations that may be used to fully tie out a supported document. A significant type of annotation element is an attachment element 530 associated with various attachment versions 535. The attachment ID can be the annotation ID in the parent class, and can be the ID for a file services API that is used for the uploaded file. Information about the uploaded file may be provided along with the file: MIME type, size, date/time, user ID of uploader, and file storage object ID; these may be stored on the attachment annotation for future reference. The label can be a filename, or a user-friendly alias for the filename, and may be provided as an editable entity at the top of a placeholder 420. It may also include the user ID of the person or proxy making the attachment (i.e., the user who provided the file upload—which may be different from the person who created the placeholder to begin with (i.e., the creator ID). The tie may extend the attachment entity with more specific details regarding where the supporting document entity resides.

In an embodiment, a supporting document may be aware of the supported documents pointing to it (i.e., contains information about entities utilizing it). This may be through the "tie" that relates the supporting document and the supported document. In another embodiment, the attachment may be unaware of who is pointing to it, and the binding information is associated with a selection i.e., the design is "selection-centric" rather than "attachment-centric".

The bookmark element 540, foot element 550, and comment thread element 560 associated with a plurality of comments 565 are variants of annotations. The comments 565 have a comment head/body and associated responses; it may include text, audio, images, video, and any other form of media data.

Figure 16B:
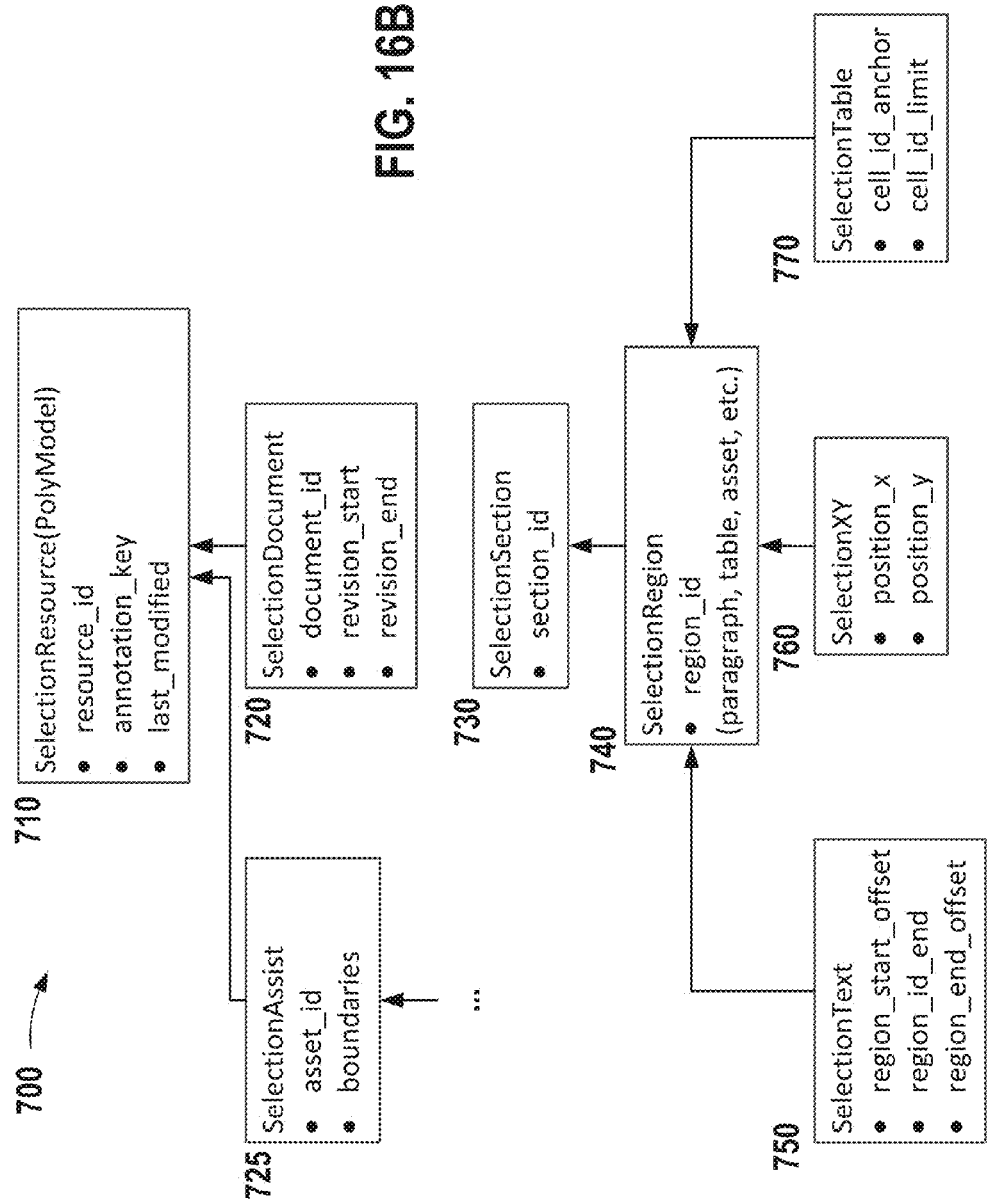
FIG. 16B is a block diagram illustrating an example type definition of a selection resource.

FIG. 16B is a block diagram illustrating the hierarchical structure 700 of a polymodel for a selection resource element. In an embodiment, selections are used to point to some form of an annotation. The base selection resource element 710 contains a resource ID that may be related to a project ID. It also contains an annotation key which is the same as or related to the annotation ID of the annotation element 520. This may operate as an attachment placeholder. It also has a last modified element indicating the date/time (timestamp). The selection resource 710 can be the base for a selection document 720 containing a document ID, and a revision start and end timestamp (the latter for allowing the user to know the annotation is accurate and had the timestamp between revision x and revision y).

In theory, the design could stop at a document level of granularity, and then more specific information could be provided in an annotation/comment about the document. However, more specific forms of a selection resource can be provided. For example, the selection can relate to a particular section of the document via a selection section element 730. In an embodiment, a running commentary on a section or a workflow label (which could be an annotation) could be incorporated. A color label could be assigned a task and information provided about who can change the color, etc.

A region as the selection resource may be provided via a selection region element 740. The region can be a paragraph, table, asset, chart, etc., and specific variants of a region can be incorporated via various elements. FIG. 16B illustrates a selection text element 750 which identifies the start and end of a text region, a selection XY element 760, and a selection table element 770. For the selection table, the cell ID anchor can provide an anchor for the tick and may be, e.g., the top left cell in a selection, whereas the cell ID limit could be the bottom right cell that defines the selection region. This would provide the annotation range in the table of the supporting document. As noted above, this concept can be extended to graphics files and multimedia as well, such as time offsets/ranges within an audio file, or time offsets/ranges within a video file or frame numbers. A selection assist element 725 can be provided to cover any kind of selection that might be created for images, charts, multimedia, or other assets in our doc and/or presentation editor. It is also possible to provide additional instances for the selection resources so that a revision history is available.

Figure 17:
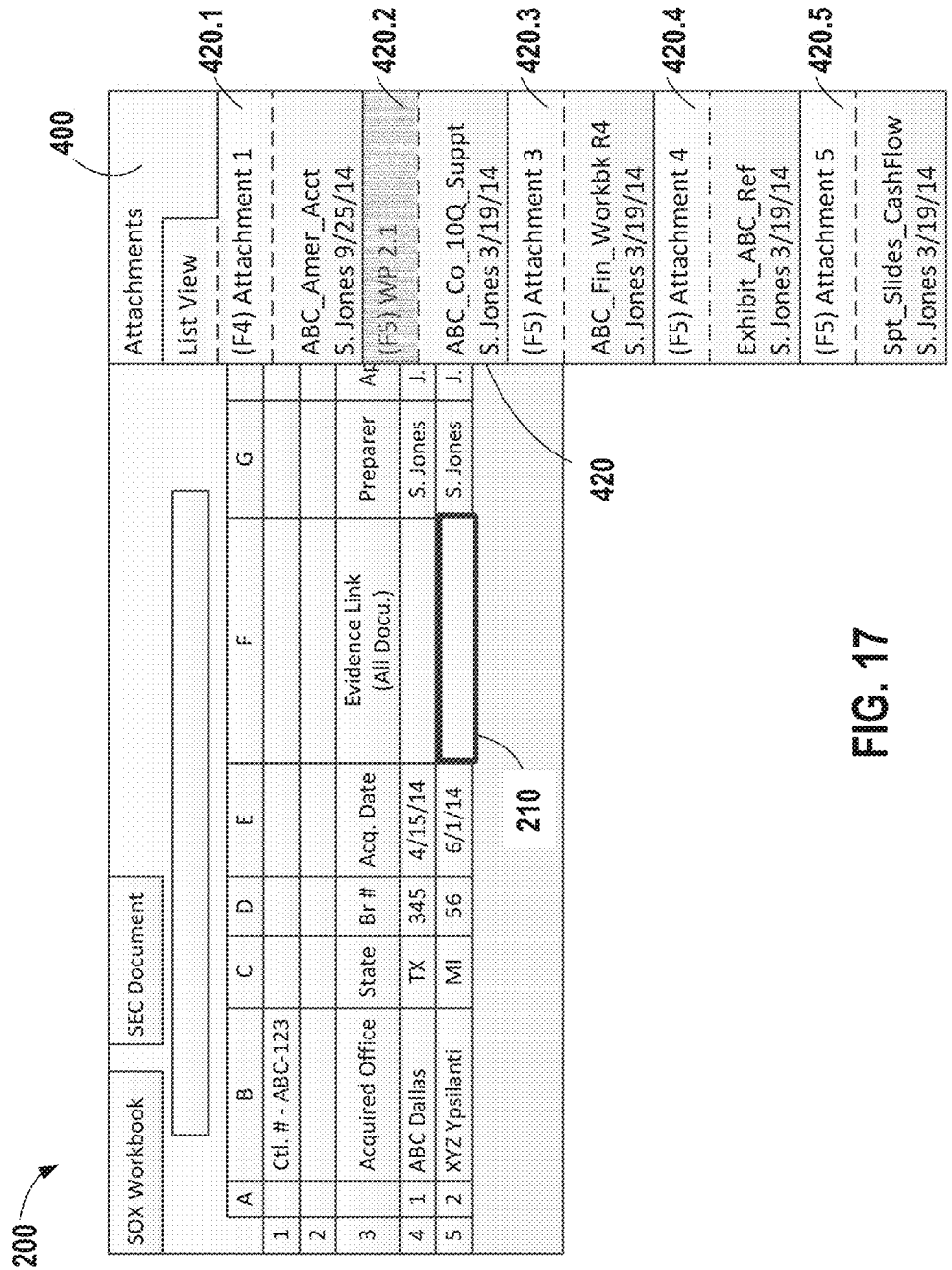
FIG. 17 is a screen shot illustrating a supported document field having multiple attachments.

FIG. 17 is an example screen shot in which the attachments window 400 shows a number of different attachments 420.1-5 that are associated with the selected field 210.

It is unlikely that one person would be the sole person collecting all relevant information associated with a complex business document; such a job involves a collaborative effort on the part of a number of different team members. FIG. 18 is a screen shot illustrating that, in addition to adding an annotation to a field, a task, i.e., an indication that an activity needs to be performed relative to the field (or collection of entities, including ranges) can be added as well. The local popup menu 240 (see FIG. 13) can provide an option for adding a task 260'. This selection can cause, e.g., an add task window or dialog box 260 to be displayed. An assignee information field 262 can be provided to the user so that an appropriate assignee for performing the task can be designated. This assignee information could be selected from a predefined list of individuals meeting some form of predefined criteria (e.g., those responsible for certain types of documents) or just typed in. Information relevant to the specific task can be entered into the task information field 264, and a due date can be provided in a due date field 266. Furthermore, a task type selector 268 can be provided that permits various types of tasks to be defined. Although the entry elements 252, 254, 262, 264 (and others) may be described as a "field", these could constitute any form of user entry element, and either permit a free-form entry of data or selection from a predefined list satisfying some form of predefined criteria.

Figure 20:
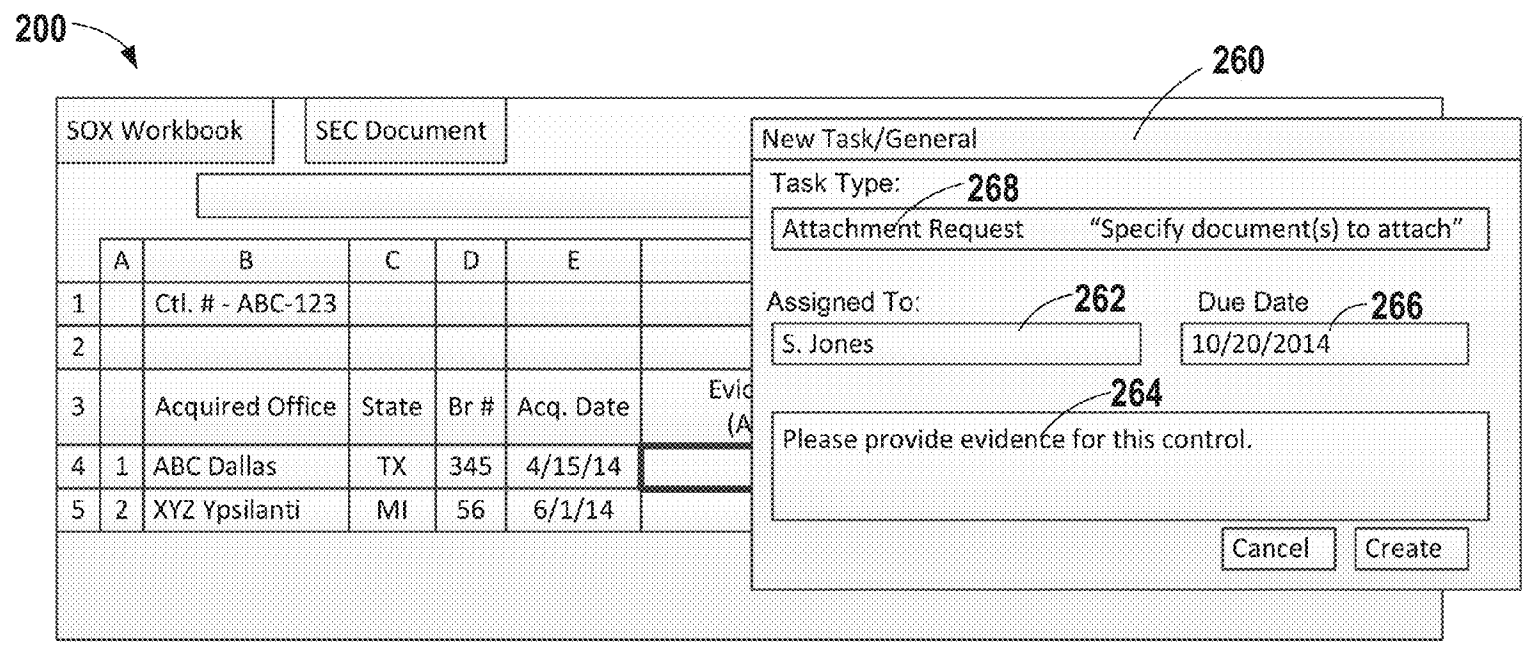

FIG. 19 is a screen shot illustrating examples of various types of tasks that can be selected via the task type selector 268. In FIG. 20, an example of selecting a task that is an "attachment request" is chosen, which is a request for a person to attach a document that supports the selected field 210 in the supported document 200. As can be seen in the task description field 264, the requester is assigning to S. Jones a task of providing evidence for the control (field 210, in this instance).

In FIG. 21, the attachments window 400 now shows an attachment request 430 associated with the supported document field 210, including the individual to whom the task is assigned 434, the due date 436, and description 438. The attachment request 430 can also include other related information, such as the person requesting the attachment, the date of the request, priority, etc. In the example shown, a user interface element 437 may be provided to permit the selection of files to attach (such a file selector may be one as described above). Tasks may be assigned to an individual person, a group, or any other entity (including an automated entity) that can perform the requested task. The attachment request 430 effectively creates a placeholder into which the attached file can be placed.

Figure 22:
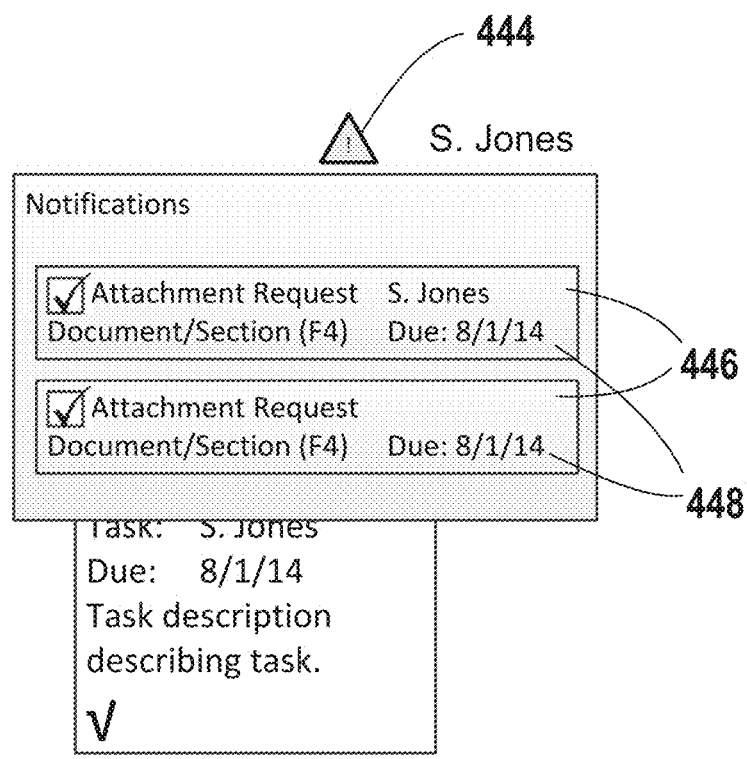
FIG. 22 is a screen shot illustrating notifications related to tasks.

Notifications can be provided to entities to which a task as been assigned. FIG. 22 illustrates an example display that can be used to notify a task delegate. By way of Examiner, S. Jones has been assigned two attachment requests 446, each indicating a due date 448. A notification indicator 444, here in the form of an icon, can be provided alerting the user that there are outstanding tasks. When the assignee clicks on the attachment request item 446, additional information can be provided that is needed to know how to complete the task. Additionally, or alternately, an email (FIG. 23) can be sent to the task delegate that identifies the task and specifics related to performing the task.

Figure 24:
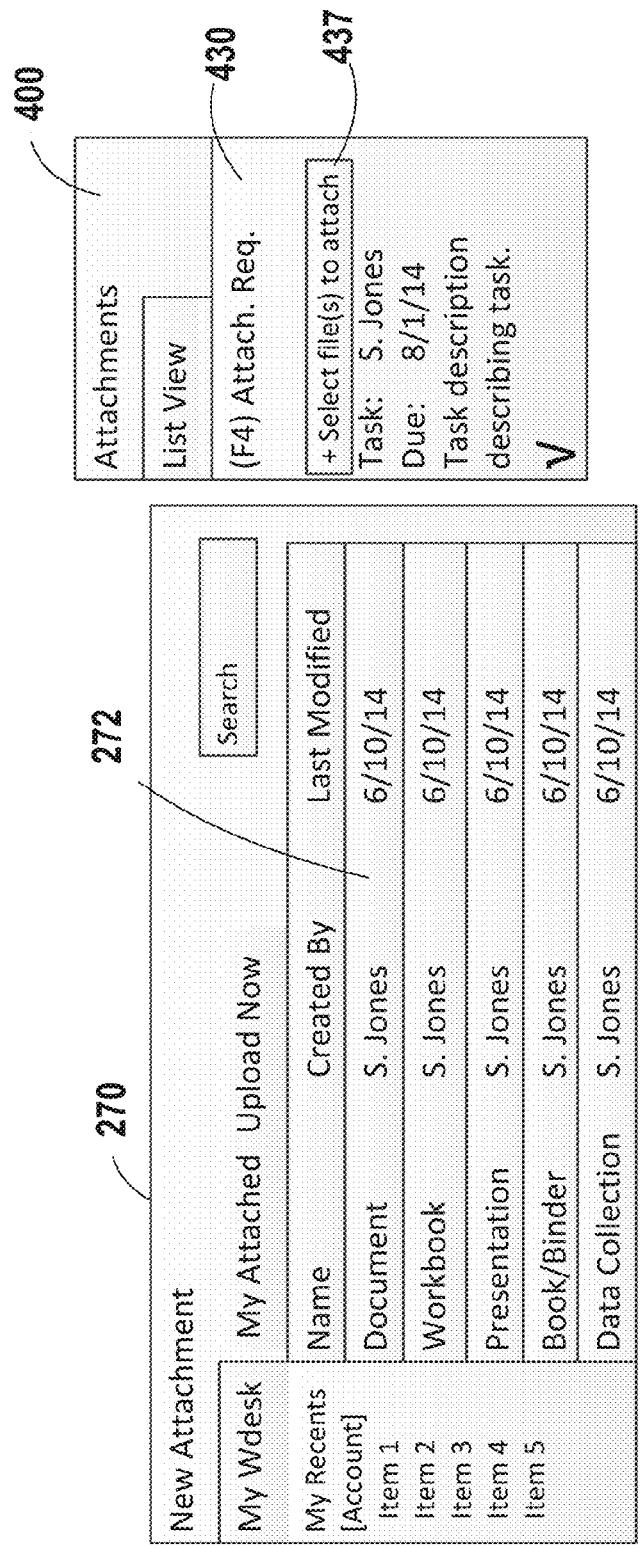
FIG. 24 is a screen shot illustrating the selection of a file related to an attachment request.
Figure 25:
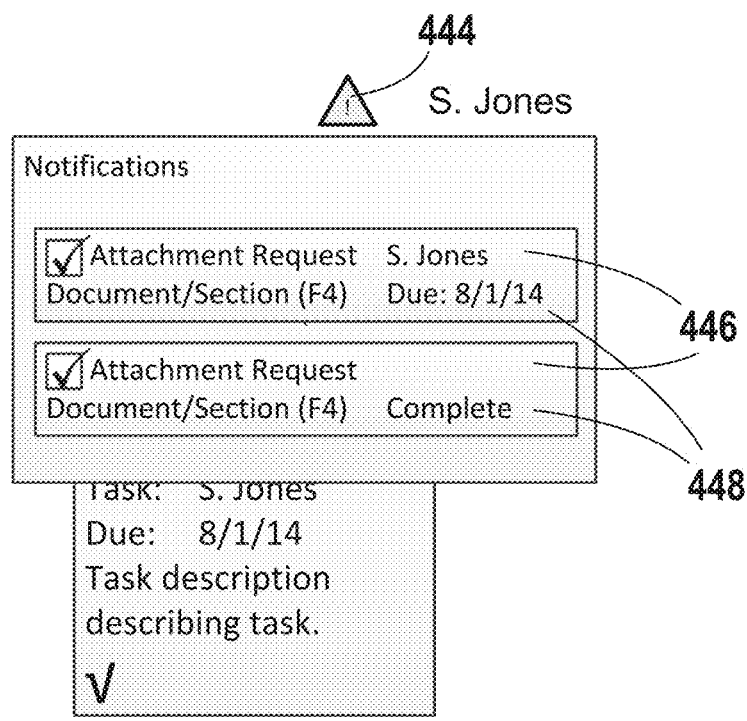
FIG. 25 is a screen shot illustrating notification related to tasks with a status indicating completion.
Figure 26:
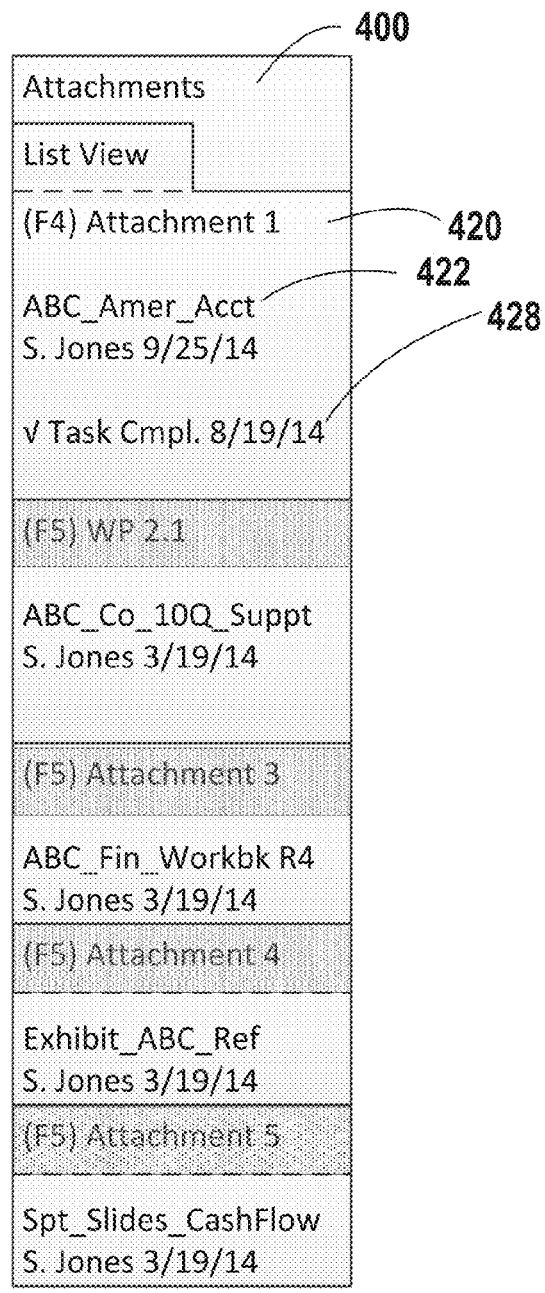
FIG. 26 is a screen shot illustrating the attachments associated with the supported document field with the attachment request completed.

FIG. 24 illustrates an example screen shot of selecting the files associated with the attachment request. In this example, the selection element 437 allows a new attachment window 270 to be displayed that provides a list of files 272 from which a selection can be made-such a selection is described above. FIG. 25 is similar to FIG. 22, except that the status of the second attachment request 446 is now shown as "Complete", once the task designee has selected the file associated with the attachment request. In FIG. 26, the attachments window 400 indicates that the task associated with attaching Attachment 1 420, as been completed (status 428).

In an embodiment, a task may be reset or generated in response to a user action or system process. For example, a first task for an attachment request is created for the supported document; it later is completed. If the attachment is subsequently deleted, the first task can be reset automatically as incomplete. In an embodiment, instead of reopening the first task a new second task may be generated using the information from the first task e.g., assignee, due date, etc. Another example of a task that may be reset or generated is a completed request for a tick and tie on a value; that task may be reset or a new similar task generated if there is a change to the value.

Figure 27:
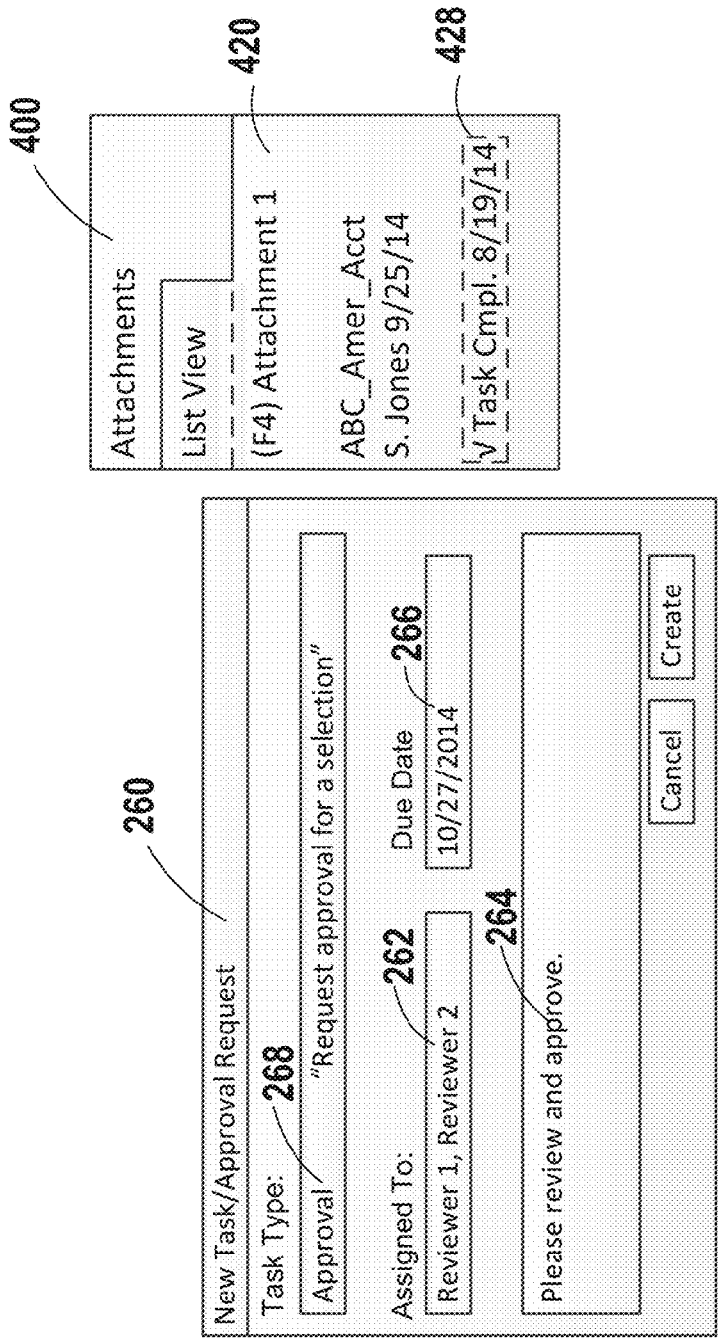
FIG. 27 is a screen shot illustrating data entry for an approval request.

Even though a task has been completed, it still might require approval from some form of reviewing authority. This could be an individual, a group, or some other approving entity (including an automated one). As shown in FIG. 27, the file that had been uploaded by S. Jones and indicated as "Task Complete" discussed above, can have a new task assigned to it via the task entry window 260, where a user selects "Approval" as the task type in the list 268. The approval, in this instance, is assigned to Reviewer 1 and Reviewer 2. In the illustrated embodiment, the two reviewers must both review and approve of the attachment, but a use of logical statements could be used to provide greater flexibility (e.g., Reviewer 1 or Reviewer 2, or (Reviewer 1 or Reviewer 2) and Reviewer 3). As noted previously, when an automated entity may be able to complete the task, a procedure handler or other form of remote task identifier could be provided.

In FIG. 28, the attachments window 400 indicates in the status field 428 that approval has been requested. Once the necessary approvers have indicated approval, the attachment associated with the field 210 can be designated "approved" (and indicated in the status field 428). The approval can be equated to a certification as well, i.e., require a signature of a certifying authority.

Figure 29:
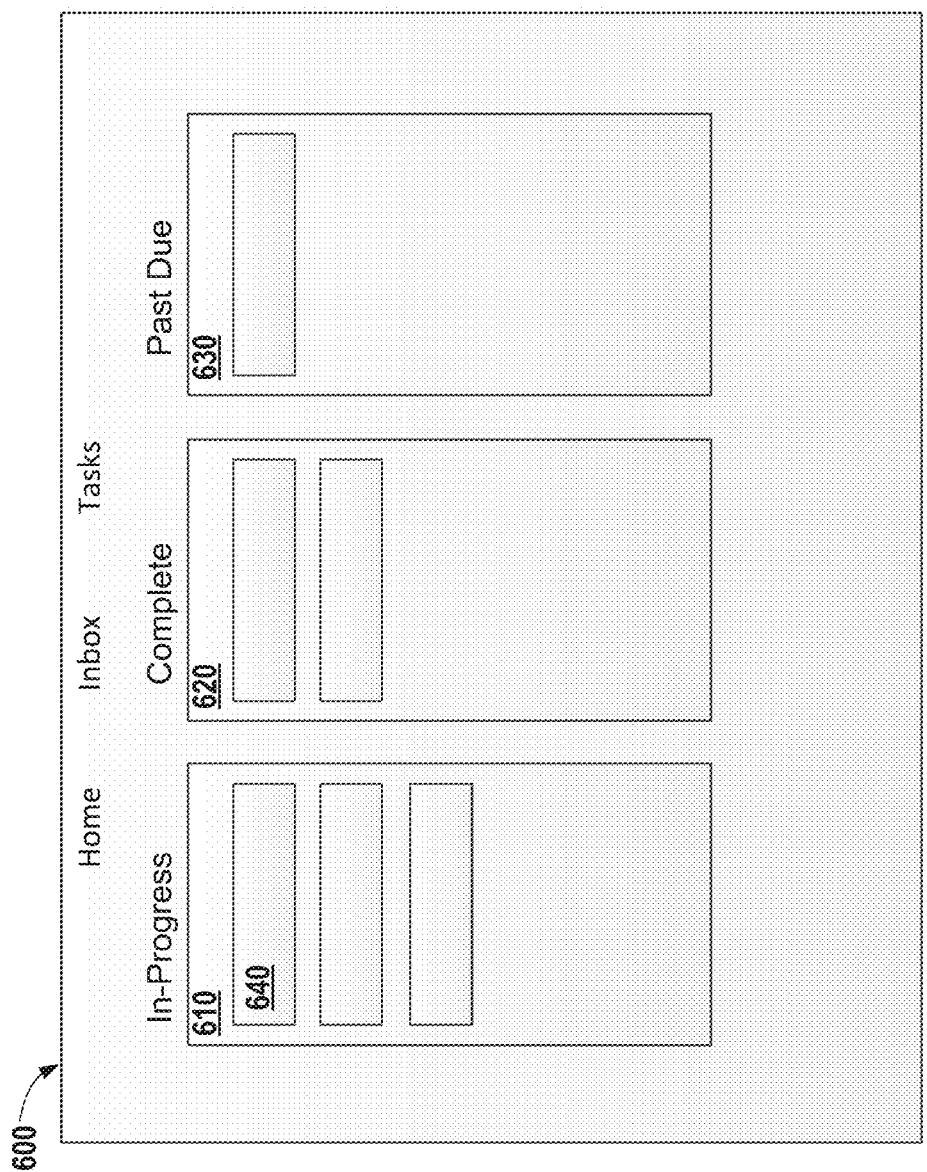
FIG. 29 is a screen shot illustrating a dashboard display for tasks having various statuses.

FIG. 29 shows an example dashboard 600 showing all tasks related to a given supported document field (or associated with a given individual, group, collection of fields, documents, etc.) By way of example tasks 640 that are in-progress 610, complete 620, and past due 630, can all be shown in an organized manner Any other form of grouping by data associated with the task can be done as well. The task data could include a unique task ID, task creator, task due date, task description, task dependencies, task creation date, task type, etc. Furthermore, a hierarchical display of tasks could be provided where task dependencies are present. In this way, relevant inputs needed for approving a high-level document can be easily seen in graphical form.

Figure 30:
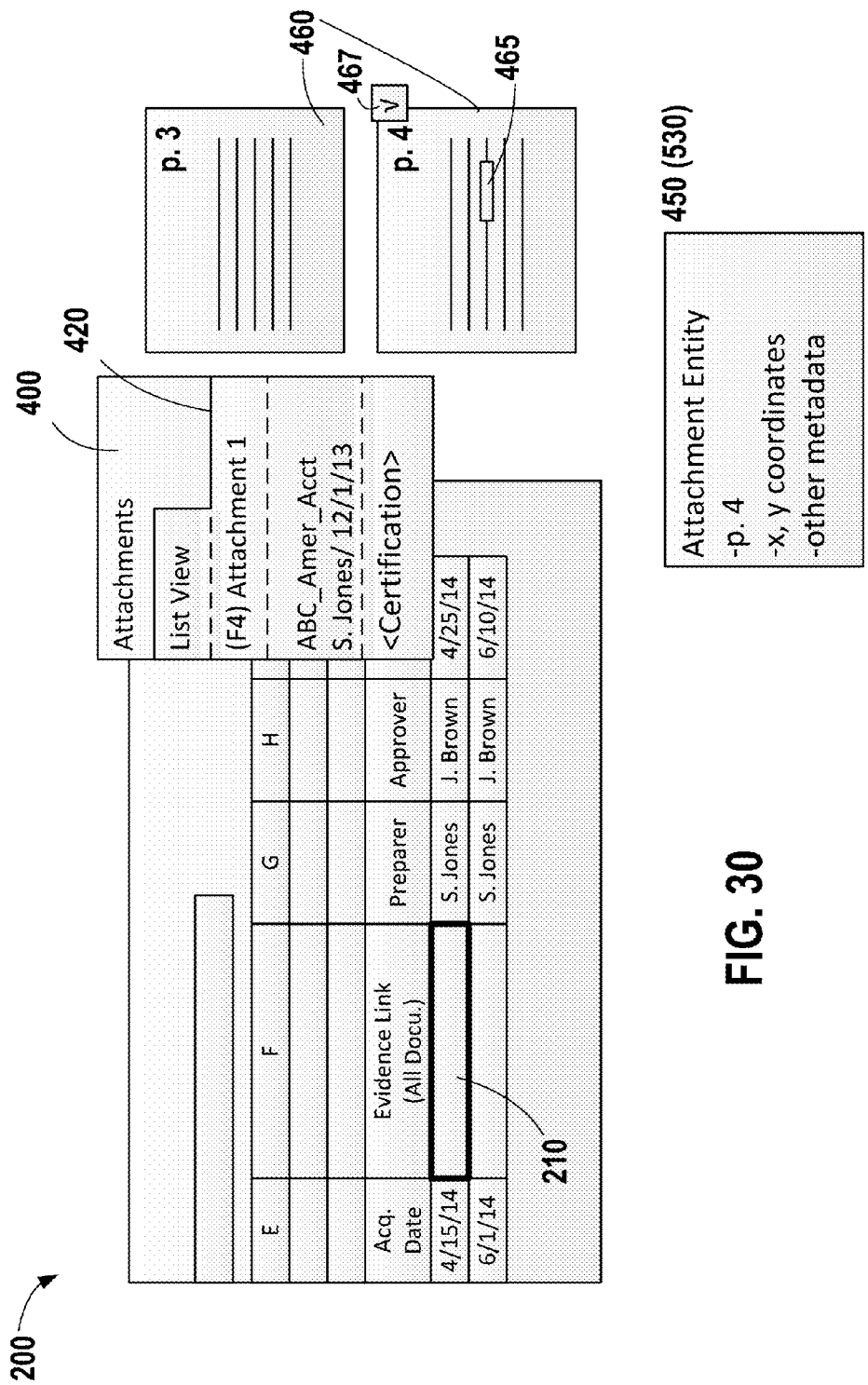
FIG. 30 is a screen shot illustrating a mechanism for performing a tie operation associated with the tick.

FIG. 30 is an example screen shot showing the ability to perform a tie of information in the supporting document. The field 210 in the supported document 200 is highlighted, resulting in the attachments window 400 to indicate a document 420 associated with it. Selecting this document indicator 420 could cause the actual attached document 460 to be displayed. In this example, line 3 of p. 4 contains the source field 465 in the attached document 460. The user can select the source field 465 and, e.g., select a tie control 467 to perform the tie. This then creates a tie entity, e.g., attachment entity 450 (530) that provides an indication of where the source field 465 is being used to support supported documents. As illustrated, the tie information may include the identification of the page number (page 4), x, y coordinate data, and any other metadata that describes this particular selection.

This tie information may be initially created locally, but then persisted into the attachment entity upon exit/save/share. In this example, if a new version of the supporting file-based document is uploaded, the attachment can be invalidated (i.e., the attachment annotation is no longer valid, and the workflow (including certification) needs to be performed again. However, with the tie being persisted into page 4 in this example, the user can re-tick and tie the data field without having to go through a lengthy supporting document again.

Although these are shown in separate windows in FIG. 30, a single window could show the relevant information in side-by-side frames, with the supported document 200 collapsing into, e.g., a vertical bar, once the relevant field is selected.

Additionally, security and/or a set of permissions can apply not only to creating particular tics and the ties, but also for accessing the supporting document, controlling who can and who cannot see certain parts of the documents, make changes to them, modify a tick and tie of another person, etc. When someone changes a number that invalidates the ticks and ties, a new version of the supporting document may need to be uploaded. A provision may be made to control who can do that, based on assigned access/authorization/permissions. Furthermore, permissions may be provided to indicate who can delete a tick or a tie.

Figure 31:
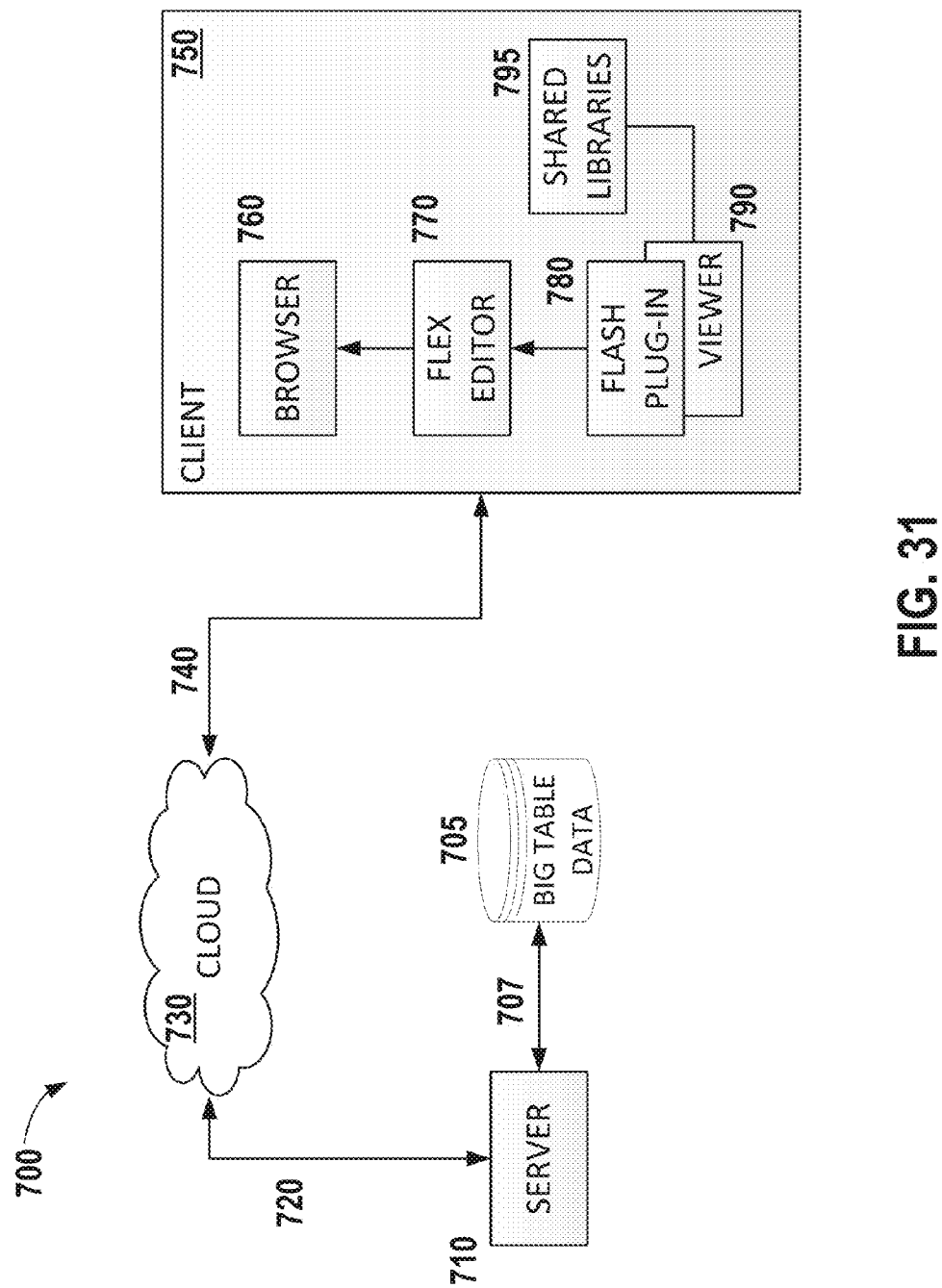
FIG. 31 is a block diagram illustrating an example architecture supporting the editing and viewing of documents.

FIG. 31 is a block diagram that illustrates an example underlying platform that can be used to support the mechanisms described above. Although a platform based on Adobe's Flex open-source framework is described, utilization of an HTML5-based viewer can also be provided. The system 700 utilizes a server 710 that accesses big table data 705 containing information related to all of the binders, documents, and other entities in the system via a server-data interface 707. The server 710 interfaces with a cloud 730 via a server-cloud interface 720. On the other side of the cloud 730 is the client 750 that is connected via a client-cloud interface 740. In one embodiment, a client browser 760 utilizes an Adobe Flex-based editor 770. An editor/viewer 790 that provides the displays described above runs on top of a flash plug-in 780, and accesses shared libraries 795 (e.g. written in Adobe's Action Script) that provide standardized algorithms for performing various functions.

In FIG. 31, a user requests to open the viewer, and a document key-coded message (what is to be fetched) is sent from the client device 750 to the cloud 730 via the client-cloud interface 740. The Flex code The server 710 may be a lightweight Linux container running on the Google App Engine (GAE) in the cloud 730 that accesses the big table data 705. The server 710 code responds with the document support data in response messages. Client 750 code then renders the received document support data from the big table data 705 received in a manner understandable by Flex and displays it on the screen.

In making a comment on the viewer, the user creates a selection of the document in the viewer and select an interface element, such as a button, indicating a desire to make a comment associated with the selection. In a worksheet, the information for creating the comment would be the table ID, a start/end cell, etc. In a text document, the information would be a document ID, paragraph ID, and start/stop character offset (or start+ length). Python code may be used to define the services method, and includes the document name, user ID, selection information, etc.

Once the comment is created, it is stored locally in memory and assigned a GUID. Once a save/post comment instruction is received, an AMF message with the comment data is sent to the server 710 where it is persisted into the big table data 705. Comments are interesting in that the selection information may be stored on both the comment thread itself (an entity in GAF) and copied to the document support data-this permits the commend data to exist in two places and permits the system to rebuild it from either. Thus, a document can be loaded and all supporting comments and threads can be obtained by using the comment thread ID.

Computer Architecture

Figure 32:
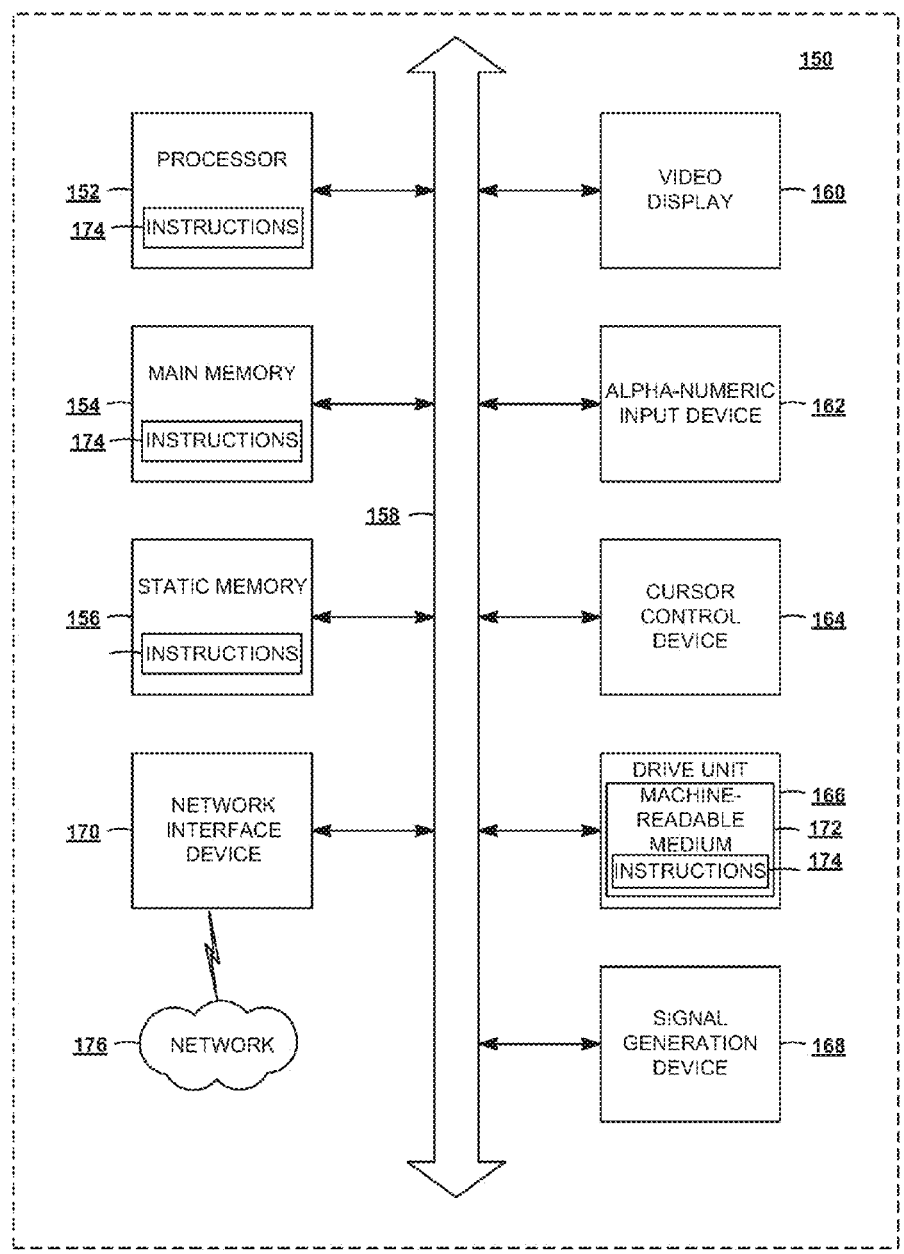
FIG. 32 is a block diagram representation of a machine in the example form of a computer system within which a set of instructions, for causing the machine to perform any one or more of the methodologies discussed herein, may be executed.

FIG. 32 is a block diagram of a machine in the form of a computer system within which a set of instructions, for causing the machine to perform any one or more of the methodologies discussed herein, may be executed. In some embodiments, the machine operates as a standalone device or may be connected (e.g., networked) to other machines. In a networked deployment, the machine may operate in the capacity of a server or a client machine in server-client network environments, or as a peer machine in peer-to-peer (or distributed) network environments. The machine may be a personal computer (PC), a tablet PC, a server, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 150 includes a processor 152 (e.g., a central processing unit (CPU), a graphics processing unit (GPU) or both), a main memory 154 and a static memory 156, which communicate with each other via a bus 158. The computer system 150 may further include a display unit 160, an alphanumeric input device 162 (e.g., a keyboard), and a user interface (UI) navigation device 164 (e.g., a mouse). In some embodiments, the display, input device and cursor control device are a touch screen display. The computer system 150 may additionally include a storage device (e.g., drive unit 166), a signal generation device 168 (e.g., a speaker), a network interface device 170, and one or more sensors (not shown), such as a global positioning system sensor, compass, accelerometer, or other sensor.

The drive unit 166 includes a machine-readable medium 172 on which is stored one or more sets of instructions and data structures (e.g., software 174) embodying or utilized by any one or more of the methodologies or functions described herein. The software 174 may also reside, completely or at least partially, within the main memory 154 and/or within the processor 152 during execution thereof by the computer system 150, the main memory 154 and the processor 152 also constituting machine-readable media.

While the machine-readable medium 172 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 174 may further be transmitted or received over a communications network 176 using a transmission medium via the network interface device 170 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., WiFi®. and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the included claims, along with the full range of equivalents to which such claims are entitled.

TABLE OF REFERENCE CHARACTERS

10 checkmark symbol
12 work papers
14 source document
16 tick mark legend
20a-20c user computers
22 network
24 application servers
26 database servers
30 phase one; extraction phase
32 second phase; editing and verification phase
34 third phase; lockdown phase
36 last phase; publication and filing phase
38 existing documents
40 new document
42 locked document
44 published document
46 database
50 document preparation application
52 data annotation module
54 user interface module
56 database management module
58 document management module
60 user management module
62 wiki system module
64 data extraction module
66 document editing module
68 document locking and publication module
70 tick mark placement module
72 tick mark library and legend
74 tick mark and legend editor
76 metadata editor/manager
78 tick mark rule editor
80 tick mark rule enforcement module
90 checkmark symbol
92 tick mark rule
100-106 process elements
110-116 process elements
120 menu; toolbar
122 checkmark
130 pointing arrow
132 checkmark symbol
134 tick information pop-up window, tick information, tick annotation, annotation
150 computer system
152 processor; CPU
154 main memory
156 static memory
158 bus
160 video display; display unit
162 alpha-numeric input device; keyboard
164 navigation device; cursor control device
166 drive unit
168 signal generation device
170 network interface device
172 machine-readable medium
174 data instructions; software
176 network
200 supported document/form; worksheet to add annotation, attachments, and/or tasks
210 form accounts receivable field; supported form field; form field associated with
220 supported form text field
230 supported form range of numbers
240 local popup menu to add annotation or task to a field
250 add annotation window
250' selection option/menu item for adding an annotation
252 file selection field
254 add annotation field
260 add task window
260' selection option/menu item for adding a task
262 add assignee field
264 add task description/information field
265 add attachment window
265' selection option/menu item for adding an attachment
266 add task due date
268 select task type
270 add attachment window
272 document list
273 selectable support binder
300 electronic support binder
302 support binder name
305 tabbed or grouped element identified sections
310, 310.x supporting documents for support binder
320 supporting document first source field, supporting document accounts receivable
334 supporting document tie information, tie annotation 400 attachments related to selected field, attachment window
410 form field associated with attachment
420 attachment item
421 attachment indicator
422 attachment filename
423 file type indicator/icon (word proc., worksheet, presentation, etc.)
424 attaching person
426 attaching date
428 task completion date/status
430 attachment request item
434 task assignee
436 task due date
437 file selector field
438 task description
440 notifications window
444 notification indicator
446 notification items
448 status/due date
450 attachment entity
460 displayed attachment
465 source selection
467 tie control
500 data model/structure
520 annotation model
530 attachment model
535 attachment version
540 bookmark
550 foot
560 comment thread
565 comment
600 dashboard indicator
610 in progress tasks
620 complete tasks
630 past due tasks
640 task indicator
700 viewing/editing system
705 big table data
707 server-data interface
710 server
720 server-cloud interface
730 cloud
740 client-cloud interface
750 client
760 browser
770 flex editor
780 flash plug-in
790 viewer
795 shared libraries

What is claimed is:

1. A computer-implemented method performed on a client device comprising a processor, a memory, and a user interface comprising a display and an input mechanism, the method comprising:
 displaying on the display a supported document, the supported document comprising a supported data item;
 receiving an instruction specifying that a particular tick mark symbol is to be associated with the supported data item;
 receiving an instruction to associate a supporting document with the supported data item, wherein the supporting document includes preexisting information that provides evidentiary support for the supported data item and is relied upon by the supported data item;
 associating meta-data with the particular tick mark symbol, wherein the meta-data includes a link to the supporting document; and
 associating the supporting document in a persistent manner with the supported data item.

2. The method of claim 1, wherein receiving an instruction to associate a supporting document with the supported data item comprises:
 receiving a filename of the supporting document, a reference of the supporting document, or an electronic reference to a location of the supporting document.

3. The method of claim 1, further comprising:
 receiving a selection of a supporting region within the supporting document, wherein the selection contains the preexisting information and indicates a tie of the preexisting information to tick mark symbol.

4. The method of claim 1, wherein the meta-data comprises:
 a user identifier associated with the supporting document; and
 a date on which the supporting document was associated with the supported data item.

5. The method of claim 1, further comprising:
 receiving a selection on the display of the supported data item;
 displaying a user interface element representing the supporting document; and
 providing a data entry mechanism through which information regarding the supporting document can be entered.

6. The method of claim 5, further comprising:
 receiving a reselection of the supported data item; and
 displaying the user interface element.

7. The method of claim 1, further comprising:
 displaying a list of documents that can be selected as supporting documents,
 wherein receiving an instruction to associate a supporting document comprises receiving a selection from the list.

8. The method of claim 1, wherein the supported data item is a data field that derives evidentiary support for its contents from the supporting document.

9. The method of claim 1, wherein the supported data item is a selected range of individual objects.

10. The method of claim 1, wherein the method is operable with all of the following types of documents:
 a text or word processing document;
 a worksheet or workbook document; and
 a presentation document.

11. The method of claim 1, further comprising displaying a user interface element representing the supporting document, wherein the user interface element includes data indicating where source data in the supporting document is being used.

12. The method of claim 1, wherein the tick mark symbol represents that evidence in support of a conclusion has been associated with the supported data item.

13. A computer-implemented method comprising:
 displaying a supported document, the supported document including a supported data item;
 receiving, from a first user, an instruction specifying that a particular tick mark symbol is to be associated with the supported data item;
 receiving, from the first user, an instruction to create a task associated with providing a supporting document, including the identity of a second user who is to provide the supporting document for the supported data item;
 notifying the second user of the task;

receiving, from the second user, a selection of the supporting document;

associating meta-data with the particular tick mark symbol, wherein the meta-data includes a link to the supporting document; and associating the supporting document in a persistent manner with the supported data item.

14. The method of claim 13, further comprising, receiving, from the first user, a due date for the task and a description of the task.

15. The method of claim 13, wherein the notifying the second user comprises displaying an icon to the second user.

16. The method of claim 13, wherein the notifying the second user comprises sending the second user a notification message.

17. The method of claim 13, further comprising:

providing a display dashboard that shows a plurality of tasks and delineates the plurality of tasks according to a task status.

18. The method of claim 13, wherein the task is a request for an approval that requests an approver to approve a completed task.

19. The method of claim 18, further comprising:

providing an indication of approval or certification regarding the approval task.

20. The method of claim 13, further comprising:

updating a status associated with the task indicating completion when the associating is complete.

21. The method of claim 13, further comprising:

providing a data entry mechanism for the second user to select the supporting document.

22. The method of claim 13, further comprising receiving, from the second user, a supporting region of the supporting document.

23. The method of claim 13, further comprising:

providing a user interface element that automatically triggers the association of the supporting document with the supported data item when activated.

24. The method of claim 11, wherein the notifying is a notification that the task has been created.

* * * * *